United States Patent
Kuppa et al.

(10) Patent No.: US 11,973,788 B2
(45) Date of Patent: Apr. 30, 2024

(54) CONTINUOUS SCORING OF SECURITY CONTROLS AND DYNAMIC TUNING OF SECURITY POLICIES

(71) Applicant: Tenable, Inc., Columbia, MD (US)

(72) Inventors: Aditya Kuppa, Dublin (IE); Lamine Aouad, Paris (FR); Bryan Doyle, Kilmacanogue (IE)

(73) Assignee: TENABLE, INC., Columbia, MD (US)

( * ) Notice: Subject to any disclaimer, the term of this patent is extended or adjusted under 35 U.S.C. 154(b) by 272 days.

(21) Appl. No.: 17/195,060

(22) Filed: Mar. 8, 2021

(65) Prior Publication Data

US 2022/0286474 A1   Sep. 8, 2022

(51) Int. Cl.
*H04L 9/40*   (2022.01)
*G06F 21/57*  (2013.01)
*G06N 5/04*   (2023.01)

(52) U.S. Cl.
CPC ........ *H04L 63/1433* (2013.01); *G06F 21/577* (2013.01); *G06N 5/04* (2013.01); *H04L 63/145* (2013.01)

(58) Field of Classification Search
CPC . H04L 63/1433; H04L 63/145; G06F 21/577; G06N 5/04
See application file for complete search history.

(56) References Cited

U.S. PATENT DOCUMENTS

| | | | | |
|---|---|---|---|---|
| 8,683,595 B1 * | 3/2014 | Barker | ..................... | G06F 21/51 380/270 |
| 9,195,829 B1 * | 11/2015 | Goradia | .................. | G06F 21/55 |
| 11,457,031 B1 * | 9/2022 | Bisht | ........................ | G06N 7/01 |
| 11,470,106 B1 * | 10/2022 | Lin | ...................... | H04L 63/1433 |
| 11,503,075 B1 * | 11/2022 | Sirianni | .............. | H04L 63/1416 |
| 11,516,222 B1 * | 11/2022 | Srinivasan | .......... | H04L 41/0654 |
| 11,611,590 B1 * | 3/2023 | Amar | ..................... | G06N 20/00 |
| 2013/0246639 A1 * | 9/2013 | Nedbal | .................... | H04L 63/10 709/228 |
| 2016/0359899 A1 * | 12/2016 | Zandani | .............. | H04L 63/1425 |
| 2018/0375892 A1 * | 12/2018 | Ganor | .................... | H04L 63/20 |
| 2020/0162497 A1 * | 5/2020 | Iyer | ........................ | H04L 63/164 |
| 2020/0228563 A1 * | 7/2020 | Yampolskiy | ........ | H04L 61/5007 |
| 2020/0274894 A1 * | 8/2020 | Argoeti | ............... | H04L 63/1433 |
| 2021/0273968 A1 * | 9/2021 | Shaieb | ................ | H04L 63/1433 |
| 2022/0060512 A1 * | 2/2022 | Crabtree | ............. | H04L 63/1425 |
| 2022/0171856 A1 * | 6/2022 | Bhatt | .................... | G06F 21/577 |
| 2022/0286475 A1 * | 9/2022 | Mullaney | ............... | G06N 20/00 |
| 2022/0294810 A1 * | 9/2022 | Tyagi | .................. | H04L 63/1433 |

(Continued)

OTHER PUBLICATIONS

Peter Spirtes and Clark Glymour. 1991. An algorithm for fast recovery of sparse causal graphs. Social science computer review 9, 1 (1991), 62-72.

(Continued)

*Primary Examiner* — Stephen T Gundry
(74) *Attorney, Agent, or Firm* — Muncy, Geissler, Olds & Lowe, P.C.; Daniel Podhajny

(57) ABSTRACT

Techniques, methods and/or apparatuses are disclosed that enable of cyber risks on assets of networks to be evaluated in presence of security controls on the assets. In this way, effect of security controls already in place may be quantified. A novel scoring technique is presented. Also, use of causal inference is in the context of security risk assessment is described.

32 Claims, 8 Drawing Sheets

(56) References Cited

U.S. PATENT DOCUMENTS

| | | | |
|---|---|---|---|
| 2022/0303295 A1* | 9/2022 | Erlingsson | G06F 16/9038 |
| 2022/0311794 A1* | 9/2022 | Maya | G06F 11/3065 |
| 2022/0311799 A1* | 9/2022 | Du | H04L 63/20 |
| 2022/0329616 A1* | 10/2022 | O'Hearn | H04L 63/10 |
| 2022/0337617 A1* | 10/2022 | Basovskiy | G06F 16/2255 |
| 2022/0360597 A1* | 11/2022 | Fellows | H04L 51/212 |
| 2022/0360600 A1* | 11/2022 | Reed | G06F 16/9537 |
| 2022/0368727 A1* | 11/2022 | Crabtree | G06F 16/2477 |
| 2022/0377091 A1* | 11/2022 | Christian | H04L 63/1416 |
| 2022/0377093 A1* | 11/2022 | Crabtree | H04L 43/045 |
| 2022/0400129 A1* | 12/2022 | Kapoor | G06F 16/9038 |
| 2022/0400130 A1* | 12/2022 | Kapoor | G06F 16/9537 |
| 2023/0008173 A1* | 1/2023 | Crabtree | H04L 63/1441 |
| 2023/0032686 A1* | 2/2023 | Williams | G06F 16/9535 |
| 2023/0033317 A1* | 2/2023 | Lin | H04L 63/1433 |
| 2023/0075355 A1* | 3/2023 | Twigg | H04L 67/306 |

OTHER PUBLICATIONS

Peter Spirtes, Clark N Glymour, Richard Scheines, and David Heckerman. 2000. Causation, prediction, and search. MIT press.

Jerzy Splawa-Neyman, Dorota M Dabrowska, and TP Speed. 1990. On the application of probability theory to agricultural experiments. Essay on principles. Section 9. Statist. Sci. (1990), 465-472.

Blake E Strom and al. 2017. Finding cyber threats with ATT&CK-based analytics. Technical Report. Technical Report MTR170202, MITRE.

Amos Tversky and Daniel Kahneman. 1974. Judgment under uncertainty: Heuristics and biases. science 185, 4157 (1974), 1124-1131.

Valentina Viduto, Carsten Maple, Wei Huang, and David LóPez-PeréZ. 2012. A novel risk assessment and optimisation model for a multi-objective network security countermeasure selection problem. Decision Support Systems 53, 3 (2012), 599-610.

Stefan Wager and Susan Athey. 2018. Estimation and inference of heterogeneous treatment effects using random forests. J. Amer. Statist. Assoc. 113, 523 (2018), 1228-1242.

Qin Wang and Jianming Zhu. 2016. Optimal information security investment analyses with the consideration of the benefits of investment and using evolutionary game theory. In 2016 2nd International Conference on Information Management (ICIM). IEEE, 105-109.

Yixin Wang and David M Blei. 2019. The blessings of multiple causes. J. Amer. Statist. Assoc. just-accepted (2019), 1-71.

Ronald R Yager. 1988. On ordered weighted averaging aggregation operators in multicriteria decisionmaking. IEEE Transactions on systems, Man, and Cybernetics 18, 1 (1988), 183-190.

451Research. 2019. Are there too many Security Vendors? https://go.451research.com/2019-mi-are-there-too-many-security-vendors.html. [Online; accessed May 2020].

Susan Athey, Guido Imbens, Thai Pham, and Stefan Wager. 2017. Estimating average treatment effects: Supplementary analyses and remaining challenges. American Economic Review 107, 5 (2017), 278-81.

Jakub Breier. 2014. Security evaluation model based on the score of security mechanisms. Information Sciences and Technologies 6, 1 (2014), 19.

Jakub Breier and Ladislav Hudec. 2013. On selecting critical security controls. In 2013 International Conference on Availability, Reliability and Security. IEEE, 582-588.

Leo Breiman. 2001. Random forests. Machine learning 45, 1 (2001), 5-32.

Sunders Bruskin, Polina Zilberman, Rami Puzis, and Shay Shwarz. 2020. Sok: A Survey of Open Source Threat Emulators. arXiv preprint arXiv:2003.01518 (2020).

Richard Caralli, James F Stevens, Lisa R Young, and William R Wilson. 2007. Introducing OCTAVE Allegro: Improving the Information Security Risk Assessment Process. (2007).

Diego Colombo, Marloes H Maathuis, Markus Kalisch, and Thomas S Richardson. 2012. Learning high-dimensional directed acyclic graphs with latent and selection variables. The Annals of Statistics (2012), 294-321.

Daniel Dor and Yuval Elovici. 2016. A model of the information security investment decision-making process. Computers & security 63 (2016), 1-13.

Omar F El-Gayar and Brian D Fritz. 2010. A web-based multiperspective decision support system for information security planning. Decision Support Systems 50, 1 (2010), 43-54.

Robert Feldt and Ana Magazinius. 2010. Validity threats in empirical software engineering research—an initial survey. In Seke. 374-379.

Stefan Fenz, Andreas Ekelhart, and Thomas Neubauer. 2011. Information security risk management: In which security solutions is it worth investing? Communications of the Association for Information Systems 28, 1 (2011), 22.

Andrew Fielder, Emmanouil Panaousis, Pasquale Malacaria, Chris Hankin, and Fabrizio Smeraldi. 2016. Decision support approaches for cyber security investment. Decision support systems 86 (2016), 13-23.

International Organization for Standardization. 2018. IEC 27005: 2018 Information technology—Security techniques—Information security risk management. ISO/IEC (2018).

Joint Task Force. 2012. Guide for Conducting Risk Assessments. (2012).

Joint Task Force. 2013. NIST Special Publication 800-53, Revision 4 Recommended Security Controls for Federal Information Systems and Organizations. (2013).

Joint Task Force. 2019. NIST Special Publication 800-37 Revision 2. Risk Management Framework for Information Systems and Organizations: A System Life Cycle Approach for Security and Privacy. (2019).

Jack Freund and Jack Jones. 2014. Measuring and Managing Information Risk: A Fair Approach (1st ed.). Butterworth-Heinemann, Newton, MA, USA.

Michele Jonsson Funk, Daniel Westreich, Chris Wiesen, Til Stürmer, M Alan Brookhart, and Marie Davidian. 2011. Doubly robust estimation of causal effects. American journal of epidemiology 173, 7 (2011), 761-767.

Mukul Gupta, Jackie Rees, Alok Chaturvedi, and Jie Chi. 2006. Matching information security vulnerabilities to organizational security profiles: a genetic algorithm approach. Decision Support Systems 41, 3 (2006), 592-603.

Jennifer L Hill. 2011. Bayesian nonparametric modeling for causal inference. Journal of Computational and Graphical Statistics 20, 1 (2011), 217-240.

Fredrik Johansson, Uri Shalit, and David Sontag. 2016. Learning representations for counterfactual inference. In International Conference on Machine Learning (ICML 2016). 3020-3029.

Elmar Kiesling, Andreas Ekelhart, Bernhard Grill, Christine Strauss, and Christian Stummer. 2016. Selecting security control portfolios: a multi-objective simulation-optimization approach. EURO Journal on Decision Processes 4, 1-2 (2016), 85-117.

Elmar Kiesling, Christine Strauß, and Christian Stummer. 2012. A multi-objective decision support framework for simulation-based security control selection. In 2012 Seventh International Conference on Availability, Reliability and Security. IEEE, 454-462.

Yong Jick Lee, Robert J Kauffman, and Ryan Sougstad. 2011. Profit-maximizing firm investments in customer information security. Decision support systems 51, 4 (2011), 904-920.

Maxime Lenormand. 2018. Generating OWA weights using truncated distributions. International Journal of Intelligent Systems 33, 4 (2018), 791-801.

Christos Louizos, Uri Shalit, Joris M Mooij, David Sontag, Richard Zemel, and Max Welling. 2017. Causal effect inference with deep latent-variable models. In Advances in Neural Information Processing Systems (NeurIPS 2017). 6446-6456.

Jun-Jie Lv, Yong-Sheng Zhou, and Yuan-Zhuo Wang. 2011. A multi-criteria evaluation method of information security controls. In 2011 Fourth International Joint Conference on Computational Sciences and Optimization. IEEE, 190-19.

Steve Mansfield-Devine. 2018. The best form of defence—the benefits of red teaming. Computer Fraud & Security 2018, 10 (2018), 8-12. https://doi.org/10.1016/S1361-3723(18)30097-6.

(56) References Cited

OTHER PUBLICATIONS

Tomas Mikolov, Ilya Sutskever, Kai Chen, Greg S Corrado, and Jeff Dean. 2013. Distributed representations of words and phrases and their compositionality. In Advances in neural information processing systems. 3111-3119.

Simon Miller, Susan Appleby, Jonathan M Garibaldi, and Uwe Aickelin. 2013. Towards a more systematic approach to secure systems design and analysis. International Journal of Secure Software Engineering (IJSSE) 4, 1 (2013), 11-30.

Simon Miller, Christian Wagner, Uwe Aickelin, and Jonathan M Garibaldi. 2016. Modelling cyber-security experts' decision making processes using aggregation operators. computers & security 62 (2016), 229-245.

Tyler Moore, Scott Dynes, and Frederick R Chang. 2015. Identifying how firms manage cybersecurity investment. Available: Southern Methodist University. Available at: http://blog.smu.edu/research/files/2015/10/SMU-IBM.pdf (Accessed Dec. 14, 2015) 32 (2015).

Pantaleone Nespoli, Dimitrios Papamartzivanos, Félix Gómez Mármol, and Georgios Kambourakis. 2017. Optimal countermeasures selection against cyber attacks: A comprehensive survey on reaction frameworks. IEEE Communications Surveys & Tutorials 20, 2 (2017), 1361-1396.

Jacob G. Oakley. 2019. Professional Red Teaming: Conducting Successful Cybersecurity Engagements (1st ed.). APress.

Angel Rafael Otero. 2014. An Information Security Control Assessment Methodology for Organizations. (2014).

Emmanouil Panaousis, Andrew Fielder, Pasquale Malacaria, Chris Hankin, and Fabrizio Smeraldi. 2014. Cybersecurity games and investments: A decision support approach. In International Conference on Decision and Game Theory for Security. Springer, 266-286.

Ike Patterson, James Nutaro, Glenn Allgood, Teja Kuruganti, and David Fugate. 2013. Optimizing investments in cyber-security for critical infrastructure. In Proceedings of the Eighth Annual Cyber Security and Information Intelligence Research Workshop. 1-4.

Judea Pearl. 2000. Causality: models, reasoning and inference. vol. 29. Springer.

Judea Pearl. 2009. Understanding propensity scores. Causality: models, reasoning, and inference 2 (2009), 348-352.

Joseph Ramsey, Madelyn Glymour, Ruben Sanchez-Romero, and Clark Glymour. 2017. A million variables and more: the Fast Greedy Equivalence Search algorithm for learning high-dimensional graphical causal models, with an application to functional magnetic resonance images. International journal of data science and analytics 3, 2 (2017), 121-129.

Matthew Rosenquist and Timothy Casey. 2009. Prioritizing Information Security Risks with Threat Agent Risk Assessment (TARA). (2009).

Donald B Rubin. 1974. Estimating causal effects of treatments in randomized and nonrandomized studies. Journal of educational Psychology 66, 5 (1974), 688.

Donald B Rubin. 2005. Causal inference using potential outcomes: Design, modeling, decisions. J. Amer. Statist. Assoc. 100, 469 (2005), 322-331.

Jakob Runge, Sebastian Bathiany, Erik Bollt, Gustau Camps-Valls, Dim Coumou, Ethan Deyle, Clark Glymour, Marlene Kretschmer, Miguel D Mahecha, Jordi Munoz-Mari, et al. 2019. Inferring causation from time series in Earth system sciences. Nature communications 10, 1 (2019), 2553.

R Sarala, G Zayaraz, and V Vijayalakshmi. 2016. Optimal selection of security countermeasures for effective information security. In Proceedings of the International Conference on Soft Computing Systems. Springer, 345-353.

Maryam Shahpasand, Mehdi Shajari, Seyed Alireza Hashemi Golpaygani, and Hoda Ghavamipoor. 2015. A comprehensive security control selection model for inter-dependent organizational assets structure. Information & Computer Security (2015).

Uri Shalit, Fredrik D Johansson, and David Sontag. 2017. Estimating individual treatment effect: generalization bounds and algorithms. In Proceedings of the 34th International Conference on Machine Learning—vol. 70. JMLR. org, 3076-3085.

Abdulhadi Shoufan and Ernesto Damiani. 2017. On inter-Rater reliability of information security experts. Journal of information security and applications 37 (2017), 101-111.

* cited by examiner

CONTINUOUS SCORING OF SECURITY CONTROLS AND DYNAMIC TUNING OF SECURITY POLICIES

TECHNICAL FIELD

Various aspects and embodiments described herein generally relate to risk identification, and more particularly to continuous scoring of security controls and dynamic tuning of securities, e.g., in enterprises and organizations.

BACKGROUND

In many organizations, there can be numerous security controls that help defenders accurately identify and prioritize information security risks. However, lack of clarity into effectiveness and capabilities of these defenses, and poor visibility into the overall risk posture, have led to a crisis of prioritization. Lately, organizations have relied on scenario-based red teaming exercises which test the contribution of security controls to the security preparedness of the organization and test the resilience of a security set up. However, these assessments do not quantify the effect of controls on the security policies already in place.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

An embodiment may be directed to a method of determining a cyber risk score of a target asset of a target network. The method may be performed by a cyber risk scorer. The method may comprise identifying a vulnerability from a vulnerability scan data of the target asset. The method may also comprise determining a raw cyber risk score of the identified vulnerability. The method may further comprise identifying a security control applicable to the target asset. The method may yet comprise determining an effective cyber risk score corresponding to the raw cyber risk score based on the identified security control and based on an observational dataset. The observational dataset may be associated with a plurality of observational assets, a plurality of observational security controls, and a plurality observational vulnerabilities. The observational dataset may comprise a plurality of observed outcomes, which may be outcomes of vulnerability checks of one or more of the observational vulnerabilities performed on one or more of the observational assets on which one or more of the observational security controls are present.

An embodiment may be directed to cyber risk scorer. The cyber risk scorer may comprise a memory and at least one processor coupled to the memory. The memory and the at least one processor may be configured to identify a vulnerability from a vulnerability scan data of a target asset of a target network. The memory and the at least one processor may also be configured to determine a raw cyber risk score of the identified vulnerability. The memory and the at least one processor may further be configured to identify a security control applicable to the target asset. The memory and the at least one processor may yet be configured to determine an effective cyber risk score corresponding to the raw cyber risk score based on the identified security control and based on an observational dataset. The observational dataset may be associated with a plurality of observational assets, a plurality of observational security controls, and a plurality observational vulnerabilities. The observational dataset may comprise a plurality of observed outcomes, which may be outcomes of vulnerability checks of one or more of the observational vulnerabilities performed on one or more of the observational assets on which one or more of the observational security controls are present.

An embodiment may be directed to cyber risk scorer. The cyber risk scorer may comprise means for identifying a vulnerability from a vulnerability scan data of a target asset of a target network. The cyber risk scorer may also comprise means for determining a raw cyber risk score of the identified vulnerability. The cyber risk scorer may further comprise means for identifying a security control applicable to the target asset. The cyber risk scorer may yet comprise means for determining an effective cyber risk score corresponding to the raw cyber risk score based on the identified security control and based on an observational dataset. The observational dataset may be associated with a plurality of observational assets, a plurality of observational security controls, and a plurality observational vulnerabilities. The observational dataset may comprise a plurality of observed outcomes, which may be outcomes of vulnerability checks of one or more of the observational vulnerabilities performed on one or more of the observational assets on which one or more of the observational security controls are present.

An embodiment may be directed to a non-transitory computer-readable medium storing computer-executable instructions for a cyber risk scorer. The computer-executable instructions may comprise one or more instructions causing the cyber risk scorer to identify a vulnerability from a vulnerability scan data of a target asset of a target network. The computer-executable instructions may also comprise one or more instructions causing the cyber risk scorer to determine a raw cyber risk score of the identified vulnerability. The computer-executable instructions may further comprise one or more instructions causing the cyber risk scorer to identify a security control applicable to the target asset. The computer-executable instructions may yet comprise one or more instructions causing the cyber risk scorer to determine an effective cyber risk score corresponding to the raw cyber risk score based on the identified security control and based on an observational dataset. The observational dataset may be associated with a plurality of observational assets, a plurality of observational security controls, and a plurality observational vulnerabilities. The observational dataset may comprise a plurality of observed outcomes. The observational dataset may comprise a plurality of observed outcomes, which may be outcomes of vulnerability checks of one or more of the observational vulnerabilities performed on one or more of the observational assets on which one or more of the observational security controls are present.

Other objects and advantages associated with the aspects and embodiments disclosed herein will be apparent to those skilled in the art based on the accompanying drawings and detailed description.

BRIEF DESCRIPTION OF THE DRAWINGS

A more complete appreciation of the various aspects and embodiments described herein and many attendant advantages thereof will be readily obtained as the same becomes better understood by reference to the following detailed description when considered in connection with the accompanying drawings which are presented solely for illustration and not limitation, and in which.

DETAILED DESCRIPTION

Figure 1:
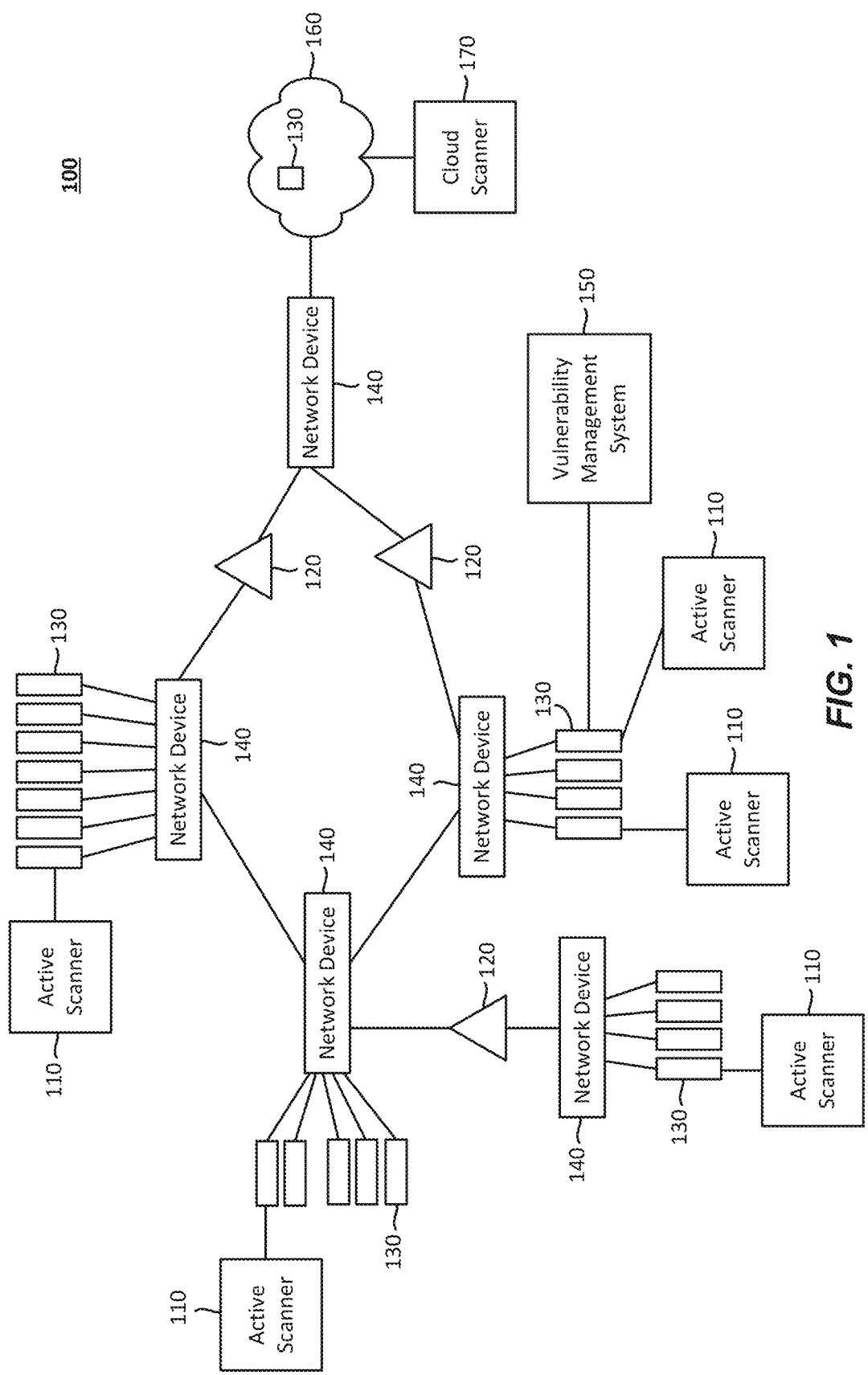
FIG. 1 illustrates an exemplary network having various assets that can be managed using a vulnerability management system, according to various aspects.

Various aspects and embodiments are disclosed in the following description and related drawings to show specific examples relating to exemplary aspects and embodiments. Alternate aspects and embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage, or mode of operation.

The terminology used herein describes particular embodiments only and should not be construed to limit any embodiments disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects and/or embodiments may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, term "asset" and variants thereof may generally refer to any suitable uniquely defined electronic object that has been identified via one or more preferably unique but possibly non-unique identifiers or identification attributes (e.g., a universally unique identifier (UUID), a Media Access Control (MAC) address, a Network BIOS (NetBIOS) name, a Fully Qualified Domain Name (FQDN), an Internet Protocol (IP) address, a tag, a CPU ID, an instance ID, a Secure Shell (SSH) key, a user-specified identifier such as a registry setting, file content, information contained in a record imported from a configuration management database (CMDB), transport layer security (TLS) certificate, etc.). For example, the various aspects and embodiments described herein contemplate that an asset may be a physical electronic object such as, without limitation, a desktop computer, a laptop computer, a server, a storage device, a network device, a phone, a tablet, a wearable device, an Internet of Things (IoT) device, a set-top box or media player, industrial control system, etc. Furthermore, the various aspects and embodiments described herein contemplate that an asset may be a virtual electronic object such as, without limitation, a cloud instance, a virtual machine instance, a container, etc., a web application that can be addressed via a Uniform Resource Identifier (URI) or Uniform Resource Locator (URL), and/or any suitable combination thereof.

Those skilled in the art will appreciate that the above-mentioned examples are not intended to be limiting but instead are intended to illustrate the ever-evolving types of resources that can be present in a modern computer network. As such, the various aspects and embodiments to be described in further detail below may include various techniques to manage network vulnerabilities according to an asset-based (rather than host-based) approach, whereby the various aspects and embodiments described herein contemplate that a particular asset can have multiple unique identifiers (e.g., a UUID and a MAC address) and that a particular asset can have multiples of a given unique identifier (e.g., a device with multiple network interface cards (NICs) may have multiple unique MAC addresses). Furthermore, as will be described in further detail below, the various aspects and embodiments described herein contemplate that a particular asset can have one or more dynamic identifiers that can change over time (e.g., an IP address) and that different assets may share a non-unique identifier (e.g., an IP address can be assigned to a first asset at a first time and assigned to a second asset at a second time). Accordingly, the identifiers or identification attributes used to define a given asset may vary with respect to uniqueness and the probability of multiple occurrences, which may be taken into consideration in reconciling the particular asset to which a given data item refers. Furthermore, in the elastic licensing model described herein, an asset may be counted as a single unit of measurement for licensing purposes.

FIG. 1 illustrates an exemplary network 100 having various assets 130 that are interconnected via one or more network devices 140 and managed using a vulnerability management system 150. More particularly, the assets 130 may include various types, including traditional assets (e.g., physical desktop computers, servers, storage devices, etc.), web applications that run self-supporting code, Internet of Things (IoT) devices (e.g., consumer appliances, conference room utilities, cars parked in office lots, physical security systems, etc.), mobile or bring-your-own-device (BYOD) resources (e.g., laptop computers, mobile phones, tablets, wearables, etc.), virtual objects (e.g., containers and/or virtual machine instances that are hosted within the network 100, cloud instances hosted in off-site server environments, etc.). Those skilled in the art will appreciate that the assets 130 listed above are intended to be exemplary only and that the assets 130 associated with the network 100 may include any suitable combination of the above-listed asset types and/or other suitable asset types. Furthermore, in various embodiments, the one or more network devices 140 may include wired and/or wireless access points, small cell base stations, network routers, hubs, spanned switch ports, network taps, choke points, and so on, wherein the network devices 140 may also be included among the assets 130 despite being labelled with a different reference numeral in FIG. 1.

The assets 130 that make up the network 100 (including the network devices 140 and any assets 130 such as cloud instances that are hosted in an off-site server environment or other remote network 160) may collectively form an attack surface that represents the sum total of resources through which the network 100 may be vulnerable to a cyberattack. As will be apparent to those skilled in the art, the diverse nature of the various assets 130 make the network 100 substantially dynamic and without clear boundaries, whereby the attack surface may expand and contract over time in an often unpredictable manner thanks to trends like BYOD and DevOps, thus creating security coverage gaps and leaving the network 100 vulnerable. For example, due at least in part to exposure to the interconnectedness of new types of assets 130 and abundant software changes and updates, traditional assets like physical desktop computers, servers, storage devices, and so on are more exposed to security vulnerabilities than ever before. Moreover, vulnerabilities have become more and more common in self-supported code like web applications as organizations seek new and innovative ways to improve operations.

Although delivering custom applications to employees, customers, and partners can increase revenue, strengthen customer relationships, and improve efficiency, these custom applications may have flaws in the underlying code that could expose the network 100 to an attack. In other examples, IoT devices are growing in popularity and address modern needs for connectivity but can also add scale and complexity to the network 100, which may lead to security vulnerabilities as IoT devices are often designed without security in mind. Furthermore, trends like mobility, BYOD, etc. mean that more and more users and devices may have access to the network 100, whereby the idea of a static network with devices that can be tightly controlled is long gone. Further still, as organizations adopt DevOps practices to deliver applications and services faster, there is a shift in how software is built and short-lived assets like containers and virtual machine instances are used. While these types of virtual assets can help organizations increase agility, they also create significant new exposure for security teams. Even the traditional idea of a perimeter for the network 100 is outdated, as many organizations are connected to cloud instances that are hosted in off-site server environments, increasing the difficulty to accurately assess vulnerabilities, exposure, and overall risk from cyberattacks that are also becoming more sophisticated, more prevalent, and more likely to cause substantial damage.

Accordingly, to address the various security challenges that may arise due to the network 100 having an attack surface that is substantially elastic, dynamic, and without boundaries, the vulnerability management system 150 may include various components that are configured to help detect and remediate vulnerabilities in the network 100. The network 100 may include one or more active scanners 110 configured to communicate packets or other messages within the network 100 to detect new or changed information describing the various network devices 140 and other assets 130 in the network 100. For example, in an implementation, the active scanners 110 may perform credentialed or uncredentialed audits to scan certain assets 130 in the network 100 and obtain information that may then be analyzed to identify potential vulnerabilities in the network 100. More particularly, in an implementation, the credentialed audits may include the active scanners 110 using suitable authentication technologies to log into and obtain local access to the assets 130 in the network 100 and perform any suitable operation that a local user could perform thereon without necessarily requiring a local agent. Alternatively and/or additionally, the active scanners 110 may include one or more agents (e.g., lightweight programs) locally installed on a suitable asset 130 and given sufficient privileges to collect vulnerability, compliance, and system data to be reported back to the vulnerability management system 150. As such, the credentialed audits performed with the active scanners 110 may generally be used to obtain highly accurate host-based data that includes various client-side issues (e.g., missing patches, operating system settings, locally running services, etc.).

On the other hand, the uncredentialed audits may generally include network-based scans that involve communicating packets or messages to the appropriate asset(s) 130 and observing responses thereto in order to identify certain vulnerabilities (e.g., that a particular asset 130 accepts spoofed packets that may expose a vulnerability that can be exploited to close established connections). Furthermore, as shown in FIG. 1, one or more cloud scanners 170 may be configured to perform a substantially similar function as the active scanners 110, except that the cloud scanners 170 may also have the ability to scan assets 130 like cloud instances that are hosted in a remote network 160 (e.g., an off-site server environment or other suitable cloud infrastructure).

Additionally, in various implementations, one or more passive scanners 120 may be deployed within the network 100 to observe or otherwise listen to traffic in the network 100, to identify further potential vulnerabilities in the network 100, and to detect activity that may be targeting or otherwise attempting to exploit previously identified vulnerabilities. In an implementation, as noted above, the active scanners 110 may obtain local access to one or more of the assets 130 in the network 100 (e.g., in a credentialed audit) and/or communicate various packets or other messages within the network 100 to illicit responses from one or more of the assets 130 (e.g., in an uncredentialed scan). In contrast, the passive scanners 120 may generally observe (or "sniff") various packets or other messages in the traffic traversing the network 100 to passively scan the network 100. In particular, the passive scanners 120 may reconstruct one or more sessions in the network 100 from information contained in the sniffed traffic.

The reconstructed sessions may then be used in combination with the information obtained with the active scanners 110 to build a model or topology describing the network 100. For example, in an implementation, the model or topology built from the information obtained with the active scanners 110 and the passive scanners 120 may describe any network devices 140 and/or other assets 130 that are detected or actively running in the network 100, any services or client-side software actively running or supported on the network devices 140 and/or other assets 130, and trust relationships associated with the various network devices 140 and/or other assets 130, among other things. In an implementation, the passive scanners 120 may further apply various signatures to the information in the observed traffic to identify vulnerabilities in the network 100 and determine whether any data in the observed traffic potentially targets such vulnerabilities. In an implementation, the passive scanners 120 may observe the network traffic continuously, at periodic intervals, on a pre-configured schedule, or in response to determining that certain criteria or conditions have been satisfied. The passive scanners 120 may then automatically reconstruct the network sessions, build or update the network model, identify the network vulnerabilities, and detect the traffic potentially targeting the network vulnerabilities in response to new or changed information in the network 100.

In an implementation, as noted above, the passive scanners 120 may generally observe the traffic traveling across the network 100 to reconstruct one or more sessions occurring in the network 100, which may then be analyzed to identify potential vulnerabilities in the network 100 and/or activity targeting the identified vulnerabilities, including one or more of the reconstructed sessions that have interactive or encrypted characteristics (e.g., due to the sessions including packets that had certain sizes, frequencies, randomness, or other qualities that may indicate potential backdoors, covert channels, or other vulnerabilities in the network 100). Accordingly, the passive scanners 120 may monitor the network 100 in substantially real-time to detect any potential vulnerabilities in the network 100 in response to identifying interactive or encrypted sessions in the packet stream (e.g., interactive sessions may typically include activity occurring through keyboard inputs, while encrypted sessions may cause communications to appear random, which can obscure activity that installs backdoors or rootkit applications).

Furthermore, in an implementation, the passive scanners 120 may identify changes in the network 100 from the encrypted and interactive sessions (e.g., an asset 130 corresponding to a new e-commerce server may be identified in response to the passive scanners 120 observing an encrypted and/or interactive session between a certain host located in the remote network 160 and a certain port that processes electronic transactions). In an implementation, the passive scanners 120 may observe as many sessions in the network 100 as possible to provide optimal visibility into the network 100 and the activity that occurs therein. For example, in an implementation, the passive scanners 120 may be deployed at any suitable location that enables the passive scanners 120 to observe traffic going into and/or out of one or more of the network devices 140. In an implementation, the passive scanners 120 may be deployed on any suitable asset 130 in the network 100 that runs a suitable operating system (e.g., a server, host, or other device that runs Red Hat Linux or FreeBSD open source operating system, a UNIX, Windows, or Mac OS X operating system, etc.).

Furthermore, in an implementation, the various assets and vulnerabilities in the network 100 may be managed using the vulnerability management system 150, which may provide a unified security monitoring solution to manage the vulnerabilities and the various assets 130 that make up the network 100. In particular, the vulnerability management system 150 may aggregate the information obtained from the active scanners 110 and the passive scanners 120 to build or update the model or topology associated with the network 100, which may generally include real-time information describing various vulnerabilities, applied or missing patches, intrusion events, anomalies, event logs, file integrity audits, configuration audits, or any other information that may be relevant to managing the vulnerabilities and assets in the network 100. As such, the vulnerability management system 150 may provide a unified interface to mitigate and manage governance, risk, and compliance in the network 100.

Figure 2:
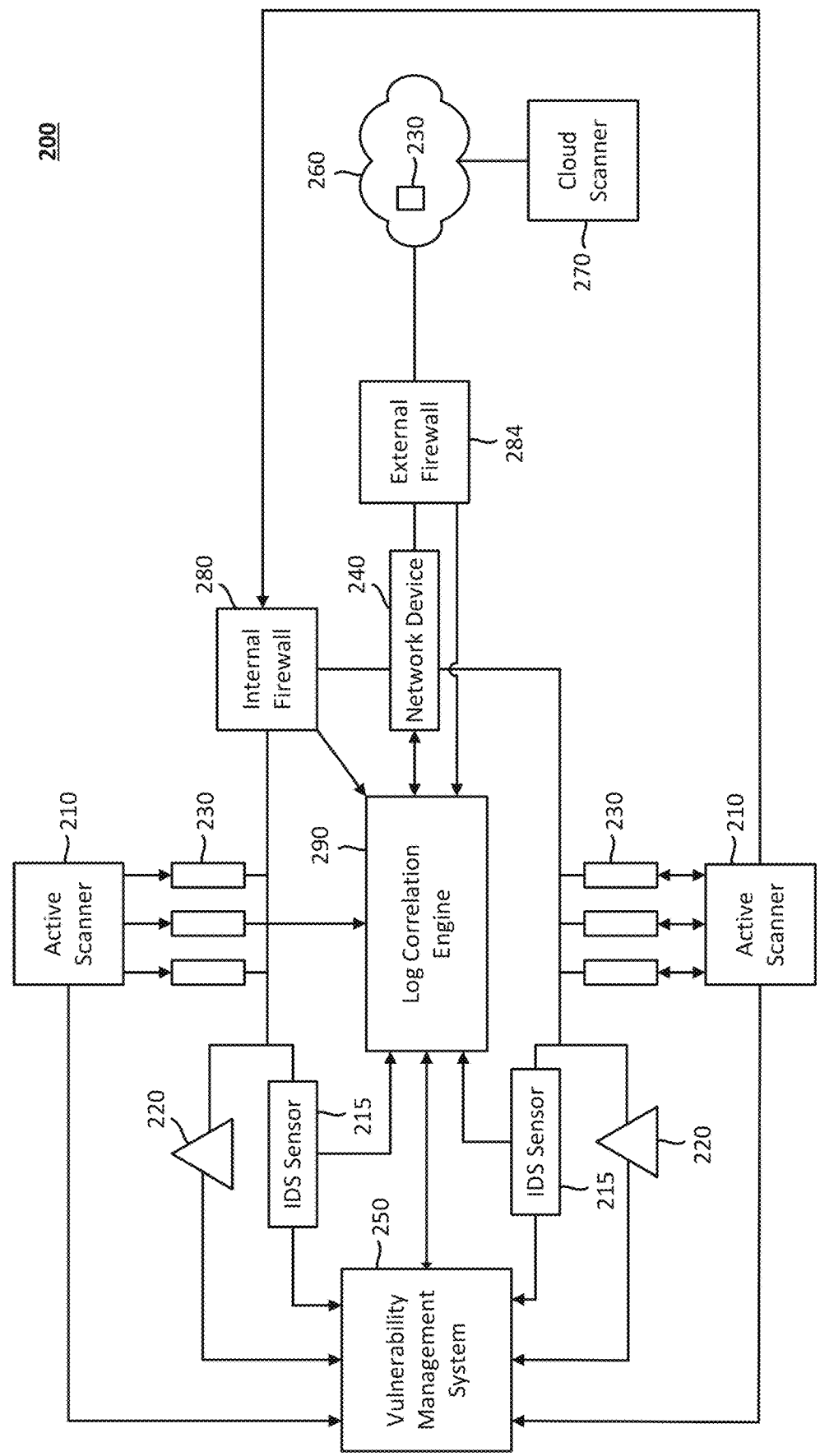
FIG. 2 illustrates another exemplary network having various assets that can be managed using a vulnerability management system, according to various aspects.

FIG. 2 illustrates another exemplary network 200 with various assets 230 that can be managed using a vulnerability management system 250. In particular, the network 200 shown in FIG. 2 may have various components and perform substantially similar functionality as described above with respect to the network 100 shown in FIG. 1. For example, in an implementation, the network 200 may include one or more active scanners 210 and/or cloud scanners 270, which may interrogate assets 230 in the network 200 to build a model or topology of the network 200 and identify various vulnerabilities in the network 200. The network 200 may also include one or more passive scanners 220 that can passively observe traffic in the network 200 to further build the model or topology of the network 200, identify further vulnerabilities in the network 200, and detect activity that may potentially target or otherwise exploit the vulnerabilities. Additionally, in an implementation, a log correlation engine 290 may be arranged to receive logs containing events from various sources distributed across the network 200. For example, in an implementation, the logs received at the log correlation engine 290 may be generated by internal firewalls 280, external firewalls 284, network devices 240, assets 230, operating systems, applications, or any other suitable resource in the network 200. Accordingly, in an implementation, the information obtained from the active scanners 210, the cloud scanners 270, the passive scanners 220, and the log correlation engine 290 may be provided to the vulnerability management system 250 to generate or update a comprehensive model associated with the network 200 (e.g., topologies, vulnerabilities, assets, etc.).

In an implementation, the active scanners 210 may be strategically distributed in locations across the network 200 to reduce stress on the network 200. For example, the active scanners 210 may be distributed at different locations in the network 200 to scan certain portions of the network 200 in parallel, whereby an amount of time to perform the active scans may be reduced. Furthermore, in an implementation, one or more of the active scanners 210 may be distributed at a location that provides visibility into portions of a remote network 260 and/or offloads scanning functionality from the managed network 200. For example, as shown in FIG. 2, one or more cloud scanners 270 may be distributed at a location in communication with the remote network 260. The term "remote network" as used herein may refer to the Internet, a partner network, a wide area network, a cloud infrastructure, and/or any other suitable external network. As such, the terms "remote network," "external network," "partner network," and "Internet" may all be used interchangeably to suitably refer to one or more networks other than the networks 100, 200 that are managed using the vulnerability management systems 150, 250, while references to "the network" and/or "the internal network" may generally refer to the areas that the systems and methods described herein may be used to protect or otherwise manage. Accordingly, in an implementation, limiting the portions in the managed network 200 and/or the remote network 260 that the active scanners 210 are configured to interrogate, probe, or otherwise scan and having the active scanners 210 perform the scans in parallel may reduce the amount of time that the active scans consume because the active scanners 210 can be distributed closer to scanning targets. In particular, because the active scanners 210 may be configured to scan limited portions of the network 200 and/or offload scanning responsibility to the cloud scanners 270, and because the parallel active scans may obtain information from the different portions of the network 200, the overall amount of time that the active scans consume may substantially correspond to the amount of time associated with one active scan.

As such, in an implementation, the active scanners 210 and/or cloud scanners 270 may generally scan the respective portions of the network 200 to obtain information describing vulnerabilities and assets in the respective portions of the network 200. In particular, the active scanners 210 and/or cloud scanners 270 may perform the credentialed and/or uncredentialed scans in the network in a scheduled or distributed manner to perform patch audits, web application tests, operating system configuration audits, database configuration audits, sensitive file or content searches, or other active probes to obtain information describing the network. For example, the active scanners 210 and/or cloud scanners 270 may conduct the active probes to obtain a snapshot that describes assets actively running in the network 200 at a particular point in time (e.g., actively running network devices 240, internal firewalls 280, external firewalls 284, and/or other assets 230). In various embodiments, the snapshot may further include any exposures that the actively running assets to vulnerabilities identified in the network 200 (e.g., sensitive data that the assets contain, intrusion events, anomalies, or access control violations associated with the assets, etc.), configurations for the actively running assets (e.g., operating systems that the assets run, whether passwords for users associated with the assets comply with certain policies, whether assets that contain sensitive data such as credit card information comply with the policies and/or industry best practices, etc.), or any other information suitably describing vulnerabilities and assets actively detected in the network 200. In an implementation, in response to obtaining the snapshot of the network 200, the active scanners 210 and/or cloud scanners 270 may then report the information describing the snapshot to the vulnerability management system 250, which may use the information to remediate and otherwise manage the vulnerabilities and assets in the network.

Furthermore, in an implementation, the passive scanners 220 may be distributed at various locations in the network 200 to monitor traffic traveling across the network 200, traffic originating within the network 200 and directed to the remote network 260, and traffic originating from the remote network 260 and directed to the network 200, thereby supplementing the information obtained with the active scanners 210. For example, in an implementation, the passive scanners 220 may monitor the traffic traveling across the network 200 and the traffic originating from and/or directed to the remote network 260 to identify vulnerabilities, assets, or information that the active scanners 210 may be unable to obtain because the traffic may be associated with previously inactive assets that later participate in sessions on the network. Additionally, in an implementation, the passive scanners 220 may be deployed directly within or adjacent to an intrusion detection system (IDS) sensor 215, which may provide the passive scanners 220 with visibility relating to intrusion events or other security exceptions that the IDS sensor 215 identifies. In an implementation, the IDS may be an open source network intrusion prevention and detection system (e.g., Snort), a packet analyzer, or any other system that having a suitable IDS sensor 215 that can detect and prevent intrusion or other security events in the network 200.

Accordingly, in various embodiments, the passive scanners 220 may sniff one or more packets or other messages in the traffic traveling across, originating from, or directed to the network 200 to identify new network devices 240, internal firewalls 280, external firewalls 284, or other assets 230 in addition to open ports, client/server applications, any vulnerabilities, or other activity associated therewith. In addition, the passive scanners 220 may further monitor the packets in the traffic to obtain information describing activity associated with web sessions, Domain Name System (DNS) sessions, Server Message Block (SMB) sessions, File Transfer Protocol (FTP) sessions, Network File System (NFS) sessions, file access events, file sharing events, or other suitable activity that occurs in the network 200. In an implementation, the information that the passive scanners 220 obtains from sniffing the traffic traveling across, originating from, or directed to the network 200 may therefore provide a real-time record describing the activity that occurs in the network 200. Accordingly, in an implementation, the passive scanners 220 may behave like a security motion detector on the network 200, mapping and monitoring any vulnerabilities, assets, services, applications, sensitive data, and other information that newly appear or change in the network 200. The passive scanners 220 may then report the information obtained from the traffic monitored in the network to the vulnerability management system 250, which may use the information provided by the passive scanners 220 in combination with the information provided from the active scanners 210 to remediate and otherwise manage the network 200.

In an implementation, as noted above, the network 200 shown in FIG. 2 may further include a log correlation engine 290, which may receive logs containing one or more events from various sources distributed across the network 200 (e.g., logs describing activities that occur in the network 200, such as operating system events, file modification events, USB device insertion events, etc.). In particular, the logs received at the log correlation engine 290 may include events generated by one or more of the internal firewalls 280, external firewalls 284, network devices 240, and/or other assets 230 in the network 200 in addition to events generated by one or more operating systems, applications, and/or other suitable sources in the network 200. In an implementation, the log correlation engine 290 may normalize the events contained in the various logs received from the sources distributed across the network 200, and in an implementation, may further aggregate the normalized events with information describing the snapshot of the network 200 obtained by the active scanners 210 and/or the network traffic observed by the passive scanners 220. Accordingly, in an implementation, the log correlation engine 290 may analyze and correlate the events contained in the logs, the information describing the observed network traffic, and/or the information describing the snapshot of the network 200 to automatically detect statistical anomalies, correlate intrusion events or other events with the vulnerabilities and assets in the network 200, search the correlated event data for information meeting certain criteria, or otherwise manage vulnerabilities and assets in the network 200.

Furthermore, in an implementation, the log correlation engine 290 may filter the events contained in the logs, the information describing the observed network traffic, and/or the information describing the snapshot of the network 200 to limit the information that the log correlation engine 290 normalizes, analyzes, and correlates to information relevant to a certain security posture (e.g., rather than processing thousands or millions of events generated across the network 200, which could take a substantial amount of time, the log correlation engine 290 may identify subsets of the events that relate to particular intrusion events, attacker network addresses, assets having vulnerabilities that the intrusion events and/or the attacker network addresses target, etc.). Alternatively (or additionally), the log correlation engine 290 may persistently save the events contained in all of the logs to comply with regulatory requirements providing that all logs must be stored for a certain period of time (e.g., saving the events in all of the logs to comply with the regulatory requirements while only normalizing, analyzing, and correlating the events in a subset of the logs that relate to a certain security posture). As such, the log correlation engine 290 may aggregate, normalize, analyze, and correlate information received in various event logs, snapshots obtained by the active scanners 210 and/or cloud scanners 270, and/or activities observed by the passive scanners 220 to comprehensively monitor, remediate, and otherwise manage the vulnerabilities and assets in the network 200. Additionally, in an implementation, the log correlation engine 290 may be configured to report information relating to the information received and analyzed therein to the vulnerability management system 250, which may use the information provided by the log correlation engine 290 in combination with the information provided by the passive scanners 220, the active scanners 210, and/or the cloud scanners 270 to remediate or manage the network 200.

Accordingly, in various embodiments, the active scanners 210 and/or cloud scanners 270 may interrogate any suitable asset 230 in the network 200 to obtain information describing a snapshot of the network 200 at any particular point in time, the passive scanners 220 may continuously or periodically observe traffic traveling in the network 200 to identify vulnerabilities, assets, or other information that further describes the network 200, and the log correlation engine 290 may collect additional information to further identify the vulnerabilities, assets, or other information describing the network 200. The vulnerability management system 250 may therefore provide a unified solution that aggregates vulnerability and asset information obtained by the active scanners 210, the cloud scanners 270, the passive scanners 220, and the log correlation engine 290 to comprehensively manage the network 200.

Current information systems contain a plethora of assets along with associated security controls that aim to ensure a specific level of security for each asset. Security administrators have to face many security issues, including multi-step cyber attacks, new and sophisticated types of threats, asset exposures, distributed and heterogeneous physical network topology's, etc.

Security controls, which are usually deployed to deal with software vulnerabilities and related threats such as malware and viruses, include patch management, antivirus software, host intrusion prevention systems, etc., with main prevention control often being patch deployment. Usually, in a large organization, thousands of systems running popular business operating systems such as Windows™ may potentially require patches to be deployed. Deploying patches across all of these systems in a timely manner is not simple. In addition to the time spent on patch assessment and testing, security teams often face restrictions on deploying the patches placed by business requirements in terms of limiting system downtime leading to minimal business disruption.

As mentioned above, organizations typically rely on scenario-based red teaming exercises to assess contribution of security controls to the security preparedness of the organization and test the resilience of a security set up. Unfortunately, these assessments do not quantify the effect of security controls on the security policies already in place. Measuring this effect can help stakeholders to recalibrate and effectively prioritize their risks. Measuring these effects can help in multiple ways: (a) Recalibrate and manage the residual risk for a given threat or class of threats given the control already installed; (b) Pivot the security investments into people, process and controls depending on the risk appetite; (c) Convey risk decisions in a data-driven fashion to stakeholders and decision-makers, and (d) Improve and manage the controls that are already in place.

In previous studies for security control scoring, great differences have been identified in the way organizations make security control decisions, which are influenced by a multitude of criteria, including policy, competitive advantage, financial considerations, quality, compliance, customer expectations, and strategy. Effectiveness of controls is assessed based on their cost and difficulty of implementation; operation, training, and maintenance cost; efficiency, effectiveness, performance, degree or number of threats addressed; and alignment with applicable standards, laws, and regulations, and stakeholder preferences.

Most of the work surveyed either run operation research (OR) simulations or relied on subject matter experts (SME) surveys to score security controls. Weightings collected by SME's carry a certain level of uncertainty. For example, the experts may not be familiar with the particular technology. Also, there can be inherent uncertainty caused by insufficient detail in the scenario, or due to individual personality. Further, optimization methods have a complex search space and are hard to converge. These methods do not take into consideration all the criteria needed for control assessment.

To address limitations of previous work, a causal inference based approach is proposed to understand influence of security control, e.g., on patching behavior, in organizations. In particular, a novel scoring function is introduced to measure effectiveness of security controls (e.g., patch management, antivirus software, host intrusion prevention systems, etc.) based on a number of criteria. The novel scoring function may also provide tunable parameters for stakeholders to choose from a set of controls. The scoring function ties in well with causal inference framework, which can help in reasoning some of the security policies inside an organization. Utilizing the scoring function along with causal inference methods, influence of security controls for threats/CVEs (common vulnerability exposures) which have high vs low CVSS (common vulnerability scoring system) scores may be assessed. Also, the average effect (e.g., delay in days) of controls on the patching timeline of an organization may be estimated.

Using the criteria, the scoring function may allow leveraging of the risk vs tradeoff values to continuously measure the effectiveness of security controls against one or more given threats or CVEs within an organization. Then stakeholder/defender may formulate the problem of measuring the security policy (e.g., patching) of the organization in the presence of the control in a causal inference setting, and utilize the scoring function to derive the effect of security controls on the patching window as an application of the scoring function.

Table 1 provides a summary of notations used with respect to causal inference. A scalar is denoted a lowercase letter (e.g., t), and a vector is denoted with an uppercase letter (e.g., X). Subscripts signify element indexes (e.g., $x_i$). Superscripts of a potential outcome variable denotes its corresponding treatment (e.g., $y_i^t$).

TABLE 1

| Symbol | Description | Context |
|---|---|---|
| $x_i$ | Features of the i-th instance. | $CVE_i$ features. |
| $T_i$ | Observed treatment of the i-th instance. | Presence/absence of security control $SC_i$ on asset |
| z | Representation of hidden confounders. | Security budget, patching policy, threat seasonality, etc. |
| $Y_i^F$ or $y_i$ | Observed outcome of the i-th instance. | Observed patch delay ($patch_{delay}$), e.g., in days, measured as a time difference to patch release date by vendor to patch applied date on asset. |
| $Y_i^t$ | Potential outcome of the i-th instance with treatment T. | Delay in patch due to presence/absence of SC. |
| $W_f$ | Corresponds to the type of treatment being administered. | SC type (e.g., Crowdstrike, Symantec, etc.) |
| $D_f$ | Corresponds to the dosage of the treatment. | Actual values of SC in terms of its impact, mitigation time, etc. |

Generally, causal inference may be described as a technique to estimate outcome changes if another treatment had been applied. For example, suppose an asset a is exposed to a CVE and there are two security controls $SC_a$ and $SC_b$, which advertise to mitigate the exposed CVE. For example, assume that the mitigation rates of $SC_a$ and $SC_b$ are recorded as 70% and 90%, respectively, via a randomized experiment on the asset a. A better mitigation rate can help a defender to prioritize patching of the CVE given that $SC_a$ or $SC_b$ is already configured on the asset a. From observational data, one can observe the delay in the application of a patch for the CVE in the presence of security control $SC_a$ or $SC_b$ and when $SC_a$ or $SC_b$ is installed on the asset a. The change of patching window may be the effect that the treatment (i.e., security control in this example) asserts on the application of patch for CVE.

In an ideal situation measuring the treatment, effects are estimated via a randomized control experiment (RCE). Unfortunately, in real-world scenarios, conducting randomized experiments are expensive, time-consuming, and sometimes not even possible. Also, measuring patching policy and mitigation rates of a security control in an organization is very specific to how the security control and the assets are configured, managed, and security policy enforced in the organization.

However, it is possible to estimate the treatment effect from observational data alone. Observational data usually include a group of assets/organizations/individuals who installed/configured different security controls, their corresponding outcomes (e.g., mitigation and patch timelines), and possibly more information (e.g., metadata of CVE, security control, etc.), but without direct access to the reason/mechanism why/how the security controls are used. Such observational data enables investigation of the fundamental problem of learning the causal effect of a certain treatment (e.g., security control) without performing randomized experiments.

Measuring the full capability of a security control (or simply "control" for ease of reference) with respect to mitigation of a given threat, one may systematically evaluate the control under one or more criteria, including any one or more of: effectiveness, coverage, assurance, cost, impact, and mitigation time among others. These may be quantified as follows:

Effectiveness (Eff) may be expressed as a probability of success to stop a threat in the target environment. Effectiveness may also depend on implementation, maintenance, and security policy set up for a given control.

Coverage (Cov) may be viewed as a ratio of number of threats found on assets in a target environment that the control can mitigate to a highest number of threats a given control can mitigate.

Assurance (Ass) may be viewed as a measure of how trustworthy and mature a security control is believed to be. A control may be considered more trustworthy (e.g., closer to 1.0), for example, if it has been rigorously and continuously tested by an independent testing laboratory.

Cost (Co) may be viewed as an estimate of the total cost of the security control. This may include implementation cost, maintenance cost, and indirect cost such as cost to acquire, integrate, operate, and train users, as applicable.

Impact (Im) may be expressed as a function of how a control affects the organization's capability to prevent, detect, and respond to a given threat.

Mitigation time (Mt) may be expressed as how rapidly new threats are mitigated.

These measures may be either derived based on estimates from SMEs or based on existing security taxonomies, including MITRE's Adversarial Tactics, Techniques, and Common Knowledge (ATT&CK), and the performance of security controls with respect to existing threats and attack techniques.

The propose technique may generally involve the following:
1. Selection of datasets to use;
2. Setting security controls criteria weights;
3. Conduct effectiveness scoring; and
4. Compute relative tradeoff scores.

The CVSS score can be expressed on a risk & tradeoff curve, which can follow a known distribution. Then the weights for each criterion of a given control can be extracted based on the residual risk. Different order weights combinations may lead to different levels of risk & tradeoff values. Thus, given a CVE CVSS score and the criteria values of the security control, a unique score may be derived for that control based on the distribution. Thereafter, using scan data, the patching window may be measured in the presence of security controls using causal inference approach and come up with the best patch window for the enterprise.

To compute or otherwise determine weightings for security controls based on their contributions to the criteria, SMEs and stakeholders may set weightings based on observations, experience, and risk appetite. For example, to determine weight of the impact Im criterion based on prevention, detection, and response (P/D/R), SMEs and stakeholder can set weightings for P/D/R, e.g., $w_p=0.5$, $w_d=0.25$, and $w_r=0.25$, respectively. This indicates that for at least this organization, prevention is more important than detection/response. If an organization has invested in security incident response/detection, then $w_p$, $w_d$, and/or $w_r$ may be adjusted accordingly. Based on observational/historic data, threat simulations, and/or by SME surveys, the control's capability to mitigate a particular threat/CVE with respect to P/D/R can be recorded as $(o_p, o_d, o_r)$.

To calculate or otherwise determine a final tradeoff score $score_{to}$ of a given security control, a weighted average, WA, may be employed. WA may combine information from all the sources by associating the evidence from each source with a given weight as follows:

$$score_{to} = (w_p \times o_p) + (w_d \times o_d) + (w_r \times o_r) \quad (1)$$

Thereafter, $score_{to}$ may be used as multiplication factor to reduce the overall risk of a CVE/threat. For example, if a CVE has a CVSS score (e.g., representing risk) of 8.9 and a security control that can help mitigate the same CVE has $score_{to}$ of 0.2, then the overall risk of the CVE may be reduced to 7.12.

An example of a proposed scoring function may described as follows. Let X be a set of n data sources (e.g., criteria) each contributing evidence $x_i$, i=1 ... n. For example, n may be 6 above. The Ordered Weighted Averaging (OWA) operators may combine information from all the sources, ordered by the size of the evidence (e.g., largest to smallest), using a predefined vector of weights, w. Formally, the OWA operator $O_w$: $\mathbb{R}^n \to \mathbb{R}$ associates a set of order weights $w = (w_1, \ldots, w_n)$ such that $\Sigma_{i=1}^n w_i$, i=1 $w_i$=1 to n criteria as follows:

$$O_w(x_1, \ldots, x_n) = \Sigma_{i=1}^n w_i x_{(i)} \quad (2)$$

where $x_{(i)}$ is the $i^{th}$ lowest value in $(x_1, \ldots, x_n)$. The first order weight $w_1$ may therefore be assigned to the criterion with the lowest value, the second order weight $w_2$ to the second lowest criterion, and so on.

Two dimensions may be associated with the set of order weights w: risk & tradeoff. Different order weight combinations $(w_1, \ldots, w_n) \in [0, 1]^n$ may lead to different levels of risk & tradeoff values. The relationship between order weights and risk & tradeoffs can form a decision strategy space usually represented by a triangle to highlight the inconsistency of certain couple of risk & tradeoff values. If the level of risk & tradeoff is expressed as a couple of values $(r, t) \in [0, 1]^2$, three vertices of the triangle may be represented by three main configurations: low risk with no tradeoff (r=0, t=0), high risk with no tradeoff (r=1, t=0) and medium risk with full tradeoff (r=0.5, t=1).

Truncated distributions can be used to generate automatically OWA weights from any risk & tradeoff values. A technical advantage of this using truncated distributions is in the formalization of the relationship between risk (e.g., likelihood that the decision made for a given threat is wrong) and tradeoff (e.g., degree of compensation between criteria) providing a clear definition of decision strategy space.

For each security control, criteria values maybe collected from multiple sources and they can be considered independently and defined by a set of criteria values. Two types of weights may be considered while using OWA operators: criterion weights and order weights. Criterion weights may indicate relative importance of the criterion in the decision process that are chosen by stakeholders. Criterion weights may be represented as a vector $V = (v_j)_{1 \leq j \leq n}$, where n stands for the number of criteria (e.g., n=6). The $j^{th}$ criterion weight may correspond to the relative importance given to the $j^{th}$ criterion. The order weights may characterize the level of risk & tradeoff taken in the decision, and may be represented as a vector $W = (w_j)_{1 \leq j \leq n}$.

Formally, the OWA operator $O_w$ may be applied to every security control i as follows:

$$OWA_i = \sum_{j=1}^{n} \left( \frac{v_{(j)} w_j}{\sum_{k=1}^{n} v_{(k)} w_k} \right) z_{i(j)} \quad (3)$$

where $z_{i(j)}$ is the $j^{th}$ lowest element of the collection of criteria $z_{ij}$ for the control i and $v_{(j)}$ is the $j^{th}$ criterion weight reordered accordingly.

Figure 3A:
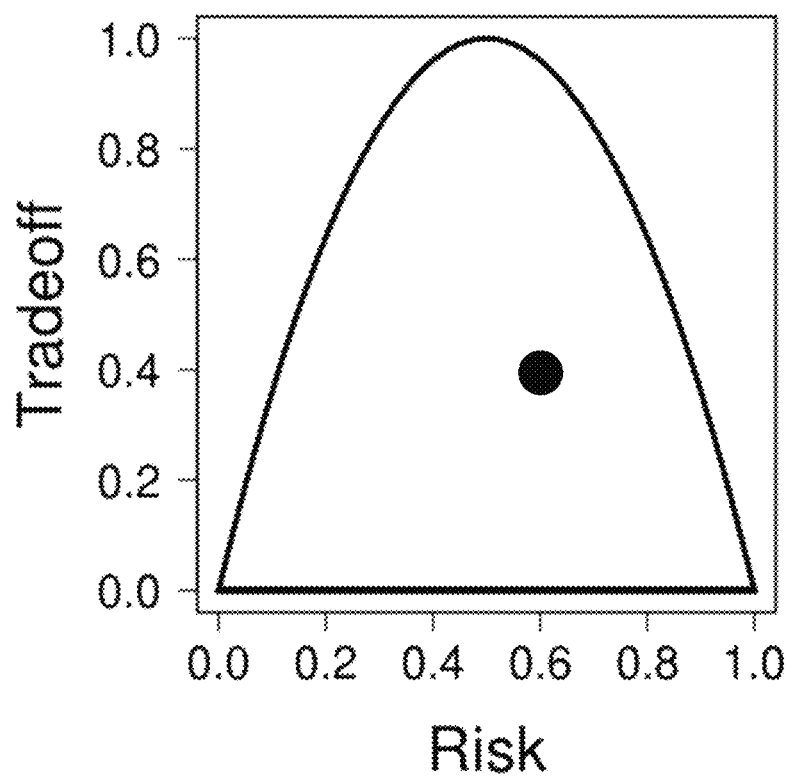
FIGS. 3A and 3B illustrate examples of a risk vs tradeoff and probability density function graphs plotted over truncated distributions, according to various aspects.
Figure 3B:
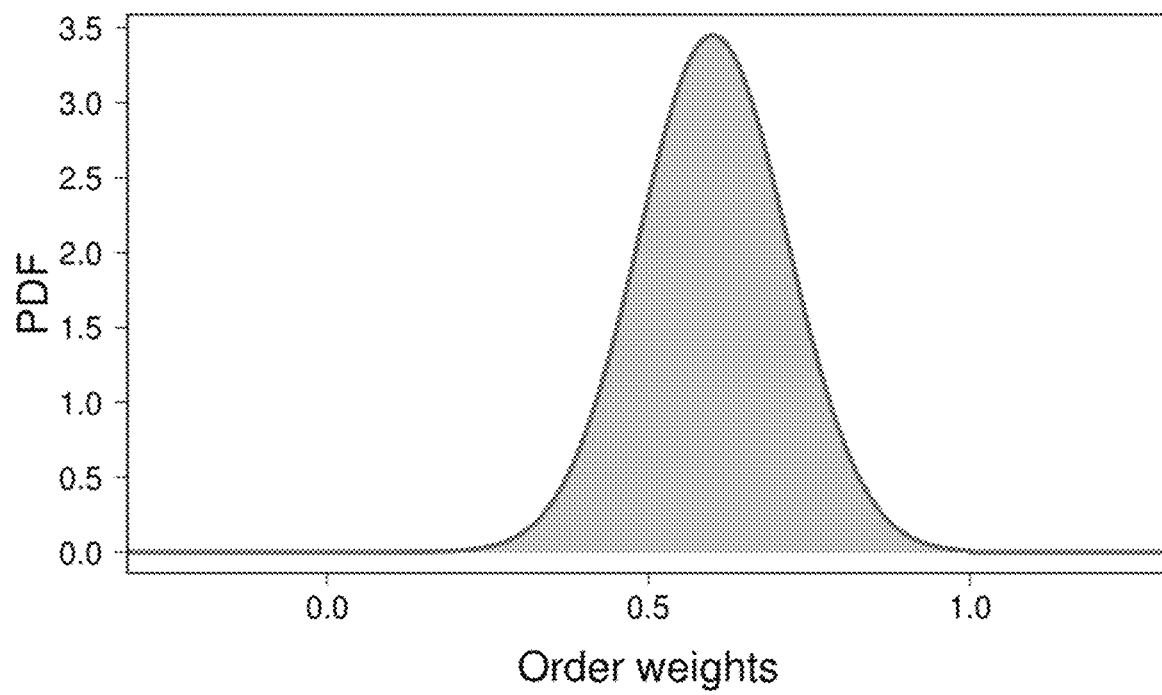

For example, to weight the impact Im criterion based on prevention, detection, and response (P/D/R), a security manager may set weights for P/D/R as $w_p$=0.5, $w_d$=0.25, and $w_r$=0.25, respectively, i.e., V=[0.5, 0.25, 0.25], e.g., emphasize prevention over detection or response. The risk & tradeoff values for a given CVE can be derived from CVSS score. For example, if the CVSS score is 9, then (r, t)=(0.9, 0.1). The truncated distributions method can be used to generate order weights W=[0.67, 0.04, 0.29]. FIGS. 3A and 3B illustrate examples of a risk vs tradeoff and probability density function (PDF) graphs plotted over truncated distributions. This mechanism helps score the control in a continuous fashion based on risk of a given CVE.

Regarding selection of datasets, datasets can be generated or otherwise gathered in a variety of ways. They include patch status dataset, attack emulation dataset, and file based mitigation dataset, among others.

Patch Status Dataset

The patch status dataset may be gathered from performing scans—credentialed and/or uncredentialed—on assets. The scanning may be performed by local and/or remote scanners. For example, a vulnerability scanner may include a set of plugins for performing vulnerability assessments on assets. The plugins may cover a great number of CVEs. Each plugin may be designed to check for a presence of a set of CVEs, misconfigurations, missing patch updates of the assets in the scanning environment, etc. Scan output may include the responses of the checks performed, the status of the software, version, and latest patch of the asset.

The outputs of the plugins may be extracted or otherwise examined to verify the presence of an endpoint protection product (e.g., security control) on the assets owned by an organization. To ensure homogeneity in the data with respect to the type of assets and patches applied, the plugin outputs may be filtered. To check the status of the patch for a set of CVEs, the date when the patch was applied and status of the vulnerability (e.g., OPEN, FIXED, etc.) may be recorded. The $patch_{delay}$ may then be calculated or otherwise determined as difference between patch applied date to patch release date by the vendor. Preferably, the asset count should be some significant number, e.g., 100-10000 or even more, so that the dataset can be considered to be a good representative sample of real-world enterprises.

Attack Emulation Dataset

An example is MITRE's ATT&CK is an open knowledge base of adversarial tactics and techniques, which is continuously updated based on real-world observations. ATT&CK matrix helps systematically evaluating the versatility of attack scenarios that can be created by an emulator and consequently estimating the ability of red teams to discover security flaws during an assessment process.

MITRE ATT&CK emulation datasets are collected by running attack simulations of ATP29, ATP3, and FIN7 ATP groups on cybersecurity products using an open methodology. In particular, the emulation datasets articulate the adversarial techniques that each evaluated tool is able to mitigate. It consists of 134 substeps covering most of the techniques covered in the attack matrix. The results are accompanied by detection type and modifiers. The detection/protection capability of the product to particular attack substep is recorded as—no-detection/no-protection, an alert was raised, threat activity was observed in telemetry and/or needed to be correlated with other alerts to detect the activity, delay (manual, processing) in alert, host interrogation was needed for detection, configuration change at detections or UX level was needed to identify the threat activity, and the residual artifact was recorded on the host for further analysis. In an aspect, the coverage Coy criterion of a security control may be determined as a percentage coverage of the security control with respect to the P/R/D results of the 134 substeps of the simulation.

File Based Mitigation Dataset

For file-based mitigation data, a number of file hashes of current attacks within some time duration (e.g., 3 months) may be gathered, e.g., from a threat intel vendor. These hashes may cover a number of CVE's, exploit files that are used by attackers in exploit kits and other threats. Next, the vendor-provided application programming interface (API) may be queried to deduce the detection rate of the threat per vendor. For hashes where the APIs do not provide the definite results of detection (e.g., when they return type-unsupported, failure, timeout, etc.), the detection average of the industry (e.g., all results returned by all vendors) may be assigned. Thereafter, score for a criterion may be arrived at or otherwise determined. For example, score vector for the impact Im may be determined as $Im_{score}=[p_{score}, d_{score}, r_{score}, fm_{score}]$, where fm represents file mitigation.

Table 1 below shows an example of different behavioral and file-based mitigation scores for different security controls. The percentages in Table 2 represent the substeps (134) coverage per security control. For example, if the security control recorded an alert for 115 substeps, then the detection rate is 85.82%.

TABLE 1

| Security Control | Protection | Detection | Response | File Mitigation |
|---|---|---|---|---|
| SC1 | 85.07% | 4.39% | 48.25% | 45% |
| SC2 | 85.82% | 62.61% | 86.21% | 48% |
| SC3 | 59.70% | 1.25% | 87.50% | 57% |
| SC4 | 85.82% | 25.22% | 80.69% | 59% |
| SC5 | 85.07% | 53.51% | 6.14% | 34% |

As previously noted, security controls may influence securities related behavior of an organization. For example, a presence may be one of the reasons for the delay in the patching of a CVE. Also, it is discussed above that the scoring function for a control based on criteria and the weighting of the observations as a function of risk & tradeoff curves that follows a Gaussian distribution.

For each vulnerability (e.g., for each CVE), different features may be extracted:
  Numeric, boolean and categorical features: Age of CVE, CVSS Vector, common platform enumeration (CPE), common weakness enumeration (CWE), common attack pattern enumeration and classification (CAPEC), MITRE techniques mapped to CVE, exploit availability and their sources, software types, etc.
  Textual features: topics extracted from media sources, web forums, paste sites, blogs, descriptions of CVE on NVD and vendor notes, mitigation steps of CVE, etc.

In the following, estimation of how specific controls influence the organization's behavior is explained in causal interference terms. In particular, individual treatment effect (ITE) of the observational data may be estimated. Consider receiving observations of the form $(x^i, t_f^i, y_f^i)$ for $i=1, \ldots, N$, where for each i, these are independent realizations of the random variables $(X, T_f, Y_f)$. Here, X may represent a feature vector lying in some feature space X, containing pre-treatment covariates of CVE. The treatment random variable (security control), $T_f$, may be a pair of values $T_f=(W_f, D_f)$, where $W_f \in \mathcal{W}$ corresponds to the type of treatment being administered (e.g. SC1, SC2, . . . ), which lies in the discrete space of k treatments, $W=\{w_1, \ldots, w_k\}$, and $D_f$ corresponds to the dosage of the treatment (e.g., parameters derived from scoring function (e.g., [Eff, Cov, Ass, Co, Im, Mt, etc.]), which, for a given treatment w lies in the corresponding treatment's dosage space, $\mathcal{D}_w$ (e.g. the interval [0, 1]). A set of all treatment-dosage pairs may be defined to be $\mathcal{T}=\{(w, d): w \in \mathcal{W}, d \in \mathcal{D}_w\}$.

A predictive model may be trained to produce accurate estimates potential outcomes $\hat{y}_t$ across the entire range of D for all available treatment options T. Ground truth data for ITE estimation are difficult to obtain in most cases, as only one of the potential outcomes can be observed. To address this issue, a semi-synthetic dataset may be generated from real-world observation by applying the scoring function to derive counterfactual from risk curves. These datasets are semi-synthetic in the sense that they are based on features collected from real-world sources. Then treatments and outcomes may be synthesized for task of learning ITEs from observational data in the presence of hidden confounders.

Variety of methods may be for the task of learning ITEs from observational data. They include (among others):
  Counterfactual Regression (CFR)—CFR maps the original features into a latent space to learn representations of confounders. CFR is trained by minimizing the error in inferred factual outcomes and tries to minimize the imbalance of confounders' representations between the treated and the controlled CVE. Following two types of representation balancing penalties may be considered: Wasserstein-1 distance (CFR-Wass) and maximum mean discrepancy (CFR-MMD). Treatment-agnostic Representation Networks (TARNet) is a variant of CFR which comes without the representation balancing penalty term.
  Causal Effect Variational Autoencoder (CEVAE)—CEVAE is a deep latent-variable model which estimates ITEs via modeling the joint distribution. It learns representations of confounders as Gaussian distributions. Then through variational inference, it may be trained by maximizing the variational lower bound of the graphical model representing the causal relations between the four variables: the features, the treatment, the outcome and the confounders.
  Causal Forest—Causal Forest is an extension of Random Forest for estimating heterogeneous treatment effects in subgroups.
  Bayesian Additive Regression Trees (BART)—BART is a Bayesian regression tree based ensemble model which is widely used for causal inference.
  Dose Response Network (DRNet)—DRNet is a neural network based method to estimate counterfactuals for multiple treatments and continuous dosages. It consists of a three-level architecture with shared layers for all treatments, multi-task layers for each treatment, and additional multi-task layers for dosage sub-intervals. Specifically, for each treatment w, the dosage interval $[a_w, b_w]$ is subdivided into E equally sized sub-intervals and a multi-task head is added for each sub-interval. The head layers each outcome $\hat{y}_t(d)$ for a range of values of the dosage parameter D, and are only trained on samples that fall within their respective dosage interval. The hierarchical structure of DRNets enables them to share common hidden representations across all samples (base layers), treatment options (treatment layers), and dosage intervals (head layers) while maintaining the influence of both t and d on the hidden layers. DRNet does expect dosages to be present in the dataset. However, there can be instances for which the weights cannot be found due to lack of external data. On such occasions, a multilayer perceptron model may be trained with multitask heads: one head for the treatment option that receives as input the dosage and estimates the average treatment effect (ATE) and one head for the no-treatment option.

Figure 4:
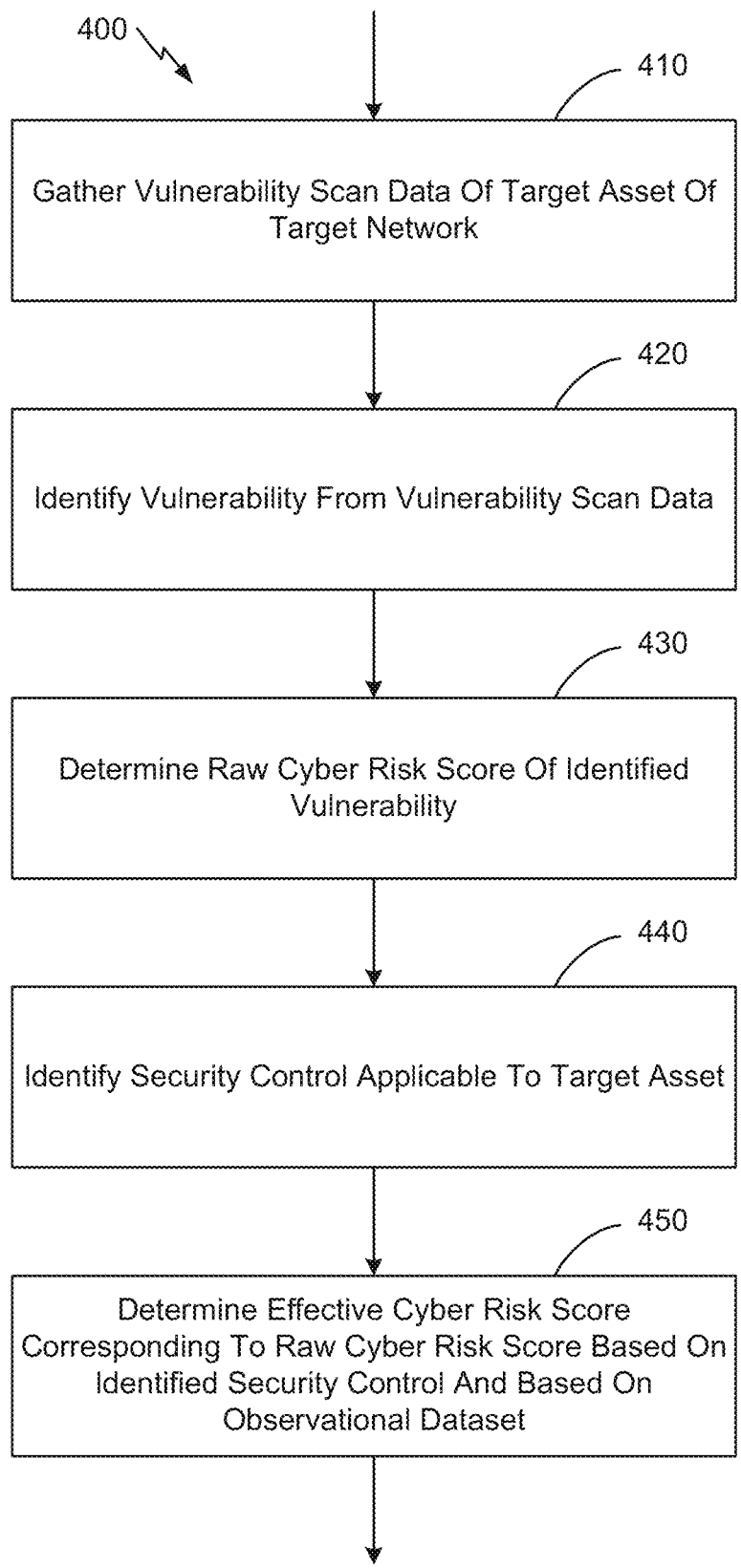
FIGS. 4-7 illustrate flow charts of an example method of determining a cyber risk score of a target asset of a target network, according to various aspects.

FIG. 4 illustrates a flow chart of an example method 400 for determining a cyber risk score of a target asset of a target network. The method 400 may be performed by a cyber risk scorer. In an aspect, the vulnerability management system 150, 250 may also perform cyber risk scorer functions. In another aspect, scanners 110, 120, 210, 220, or even assets 130, 230 themselves may perform cyber risk scorer functions as well.

In block 410, the cyber risk scorer may gather vulnerability scan data of the target asset. The vulnerability scan data may be received from one or more scanners that performs the scan, may be gathered directly by scanning the target asset, or a combination of both. For example, if a vulnerability management system (e.g., vulnerability management system 150, 250) performs the cyber risk scorer functions, the vulnerability management system may receive the vulnerability scan data from one or more scanners (e.g., one or more of the scanners 110, 120, 210, 220). In another example, a scanner (e.g., any of the scanners 110, 120, 210, 220) that performs the cyber risk scorer functions may scan the target asset to gather the vulnerability scan data. In a further example, the target asset (e.g., any of assets 130, 230) itself may perform a local scan when performing the cyber risk scorer functions.

In block 420, the cyber risk scorer may identify a vulnerability from the vulnerability scan data. The vulnerability may be a threat that has been identified and categorized. For example, the vulnerability may be a vulnerability identified by a common vulnerabilities and exposure (CVE) identifier. For ease of description, the vulnerability identified in block 420 will be prefaced with "identified".

In block 430, the cyber risk scorer may determine a raw cyber risk score of the identified vulnerability. In an aspect, a common vulnerability scoring system (CVSS) score associated with the CVE identifier of the identified vulnerability may serve as the raw cyber risk score of the identified vulnerability.

In block 440, the cyber risk scorer may identify a security control applicable to the target asset. Examples of security control include patch management systems, antivirus systems, antimalware systems, host intrusion prevention systems, etc. Also for ease of description, the security control identified in block 440 will be prefaced with "identified".

In an aspect, the identified security control may be a security control that was installed and active within the target asset when scanning of the target associated with the vulnerability scan data is performed. In other words, information on the identified security control may be included in the vulnerability scan data. In this way, effect of the identified security control, which is already in place in the target asset, may be assessed and quantified. Alternatively, the identified security control may be a security control that is not installed or active in the target asset. In this instance, prospective effect of the identified security control may be estimated, which may be worthwhile for a stakeholder.

In block 450, the cyber risk scorer may determine an effective cyber risk score corresponding to the raw cyber risk score based on the identified security control and based on an observational dataset. The observational dataset may be associated with a plurality of assets, a plurality of security controls, and a plurality vulnerabilities. For clarity and ease of distinction, the assets, security controls, and vulnerabilities of the observational dataset will be prefaced with the term "observational". Then it may be said that the observational dataset may be associated with a plurality of observational assets, a plurality of observational security controls, and a plurality observational vulnerabilities. The observational dataset may comprise a plurality of observed outcomes, which may be outcomes of vulnerability checks of one or more of the observational vulnerabilities performed on one or more of the observational assets on which one or more of the observational security controls are present. For example, each observed outcome may be an outcome of a vulnerability check of one or more of the observational vulnerabilities performed on an observational asset on which one or more of the observational security controls are present.

The observational dataset may be a patch status dataset as described above. In this instance, the patch status dataset may be gathered from scans of the plurality of observational assets covering the plurality of observational vulnerabilities in presence of the plurality of observational security controls. Alternatively, the observational dataset may be an attack emulation dataset as described above (e.g., a MITRE ATT&CK dataset). In this instance, the attack emulation dataset may be gathered from running attack simulations of one or more articulated attack techniques on the plurality of observational assets in presence of the plurality of observational security controls. The articulated attack techniques may cover the plurality of observed vulnerabilities. In another alternative, the observational dataset may be a file based mitigation dataset as described above. In this instance, the file based mitigation dataset may comprise a plurality of file hashes of attacks that occurred on the plurality of observational assets within a threshold past duration. The plurality of file hashes may cover the plurality of observed vulnerabilities in presence of the plurality of observational security controls.

In an aspect, within the observational dataset, at least one observed outcome of a vulnerability check of an observational vulnerability in a presence of an observational security control may include an indication of any one or more of the following: whether or not the observational vulnerability is prevented in the presence of the observational security control, whether or not the observational vulnerability is detected in the presence of the observational security control, and/or whether or not the observational vulnerability is responded to in the presence of the observational security control.

Figure 5:
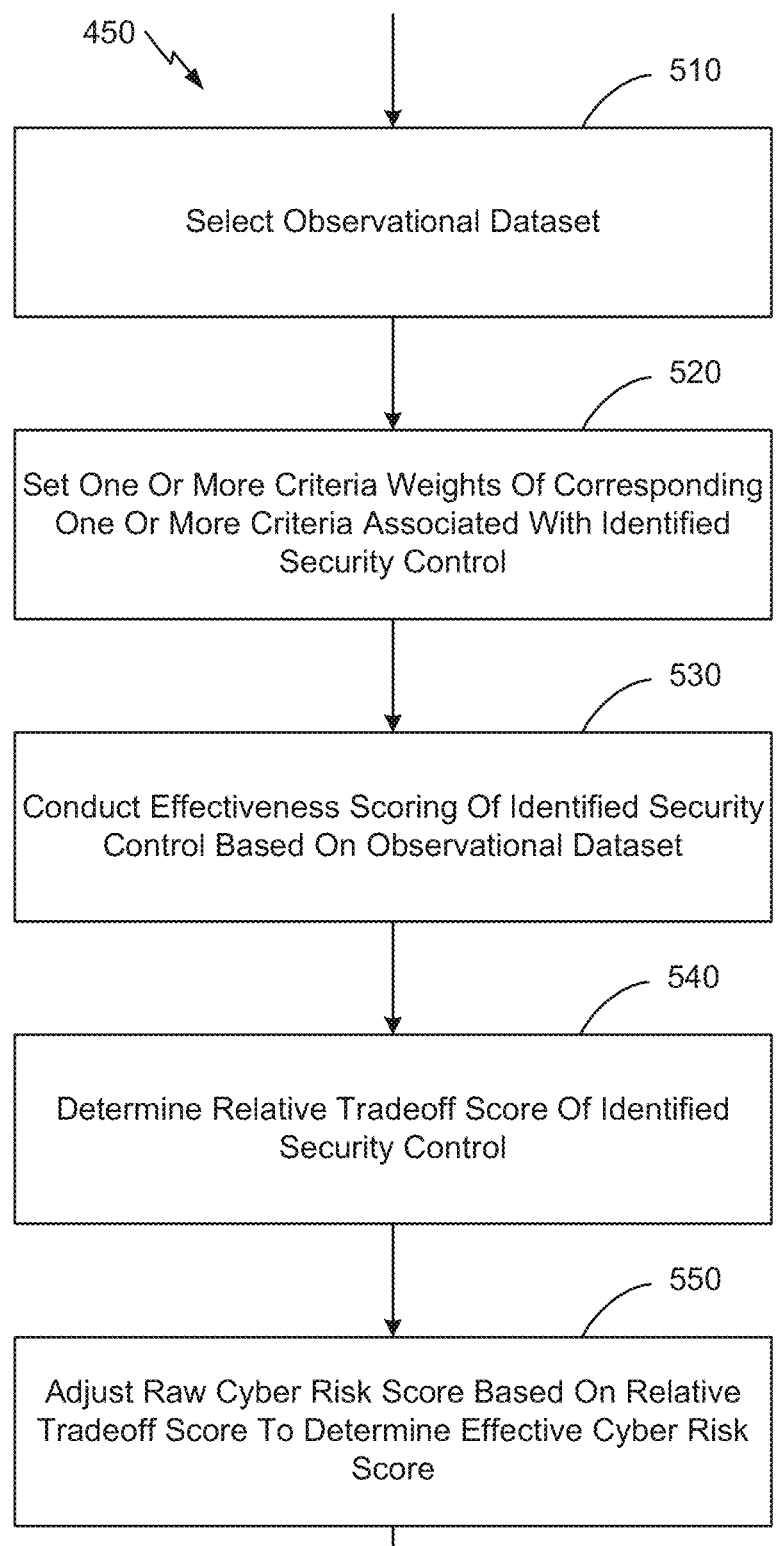

FIG. 5 illustrates a flow chart of an exemplary process that may be performed by the cyber risk scorer to implement block 450. In block 510, the cyber risk scorer may select the observational dataset.

In block 520, the cyber risk scorer may set one or more criteria weights of corresponding one or more criteria associated with the identified security control. For example, the cyber risk scorer may receive setting of criteria weights from stakeholders and defenders as indicated above. Each criteria weight v may represent a relative importance of that criteria.

Recall that the one or more criteria weights may comprise weights attributed to one or more measurement criteria of the identified security control, which may comprise any one or more of effectiveness, coverage, assurance, cost, impact, and mitigation time, as described above. In this instance, effectiveness Eff may be associated with a probability of success to stop a threat related to the identified vulnerability by the identified security control; coverage Cov may be associated with a ratio of number of threats found the target asset that the identified security control can mitigate to a highest number of threats the identified security control can mitigate; assurance Ass may be associated with a measure of trustworthiness and/or maturity of the identified security control; cost Co may be associated with a total cost of the identified security control; impact Im may be associated with a measure of how the identified security control affects a capability to prevent, detect, and/or respond to the thread related to the identified vulnerability; and mitigation time Mt may be associated with a measure of how quickly the threat related to the identified vulnerability is mitigated due to the identified security control.

In block 530, the cyber risk scorer may conduct an effectiveness scoring of the identified security control based on the observational dataset.

Figure 6:
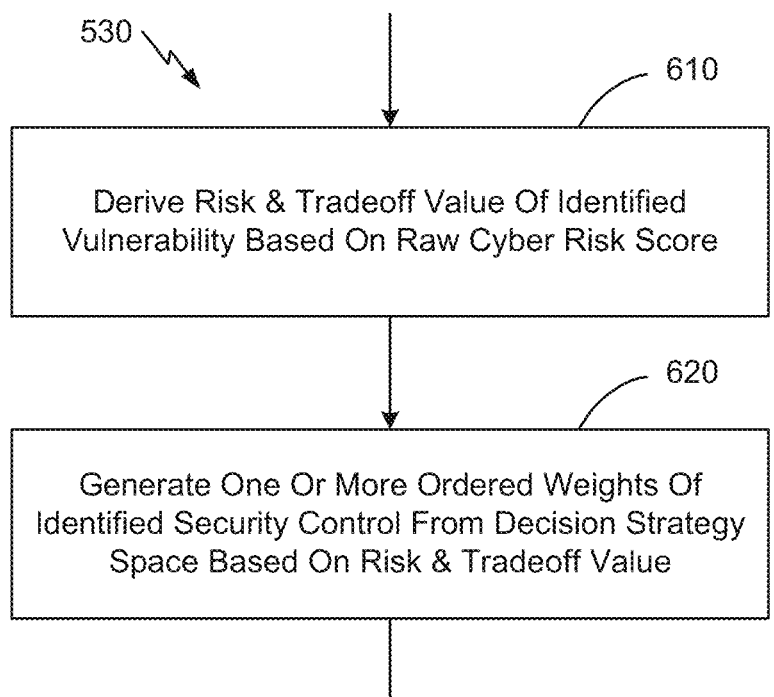

FIG. 6 illustrates a flow chart of an exemplary process that may be performed by the cyber risk scorer to implement block 530. In block 610, the cyber risk scorer may derive a risk & tradeoff value of the identified vulnerability based on the raw cyber risk score. The risk & tradeoff value may represent a decision as indicated above. The risk & tradeoff value may be a two tuple value (r, t) in which r represents the risk and t represents the tradeoff.

In block 620, the cyber risk scorer may generate one or more ordered weights w of the identified security control from a decision strategy space based on the risk & tradeoff value. The decision strategy space may be a space defined within a risk vs tradeoff coordinate space. The risk & tradeoff value may represent the decision within the decision strategy space, and the one or more ordered weights w may represent a level of risk and tradeoff taken in the decision. The decision strategy space may be a triangular decision strategy space defined within the risk vs tradeoff coordinate space. First, second, and third vertices of the triangular decision strategy space may be respectively defined by coordinates (r=0, t=0), (r=1, t=0), and (r=0.5, t=1). In an aspect, the one or more ordered weights w may be generated using a truncated distribution method as described previously.

Referring back to FIG. 5, in block 540, the cyber risk scorer may determine a relative tradeoff score of the identified security control based on an effective score of the identified security control arrived through block 530. In an aspect, an ordered weighted averaging (OWA) may be performed on the one or more ordered weights as described above with respect to equations (2) and (3). In an aspect, in determining the relative tradeoff score, causal inferences (e.g., CFR, CEVAE, Causal Forest, BART, DRNet, etc.) may be performed to estimate individual treatment effect (ITE) of the identified security control.

In block 550, the cyber risk scorer may determine the effective cyber risk score by adjusting the raw cyber risk score based on the relative tradeoff. For example, the relative tradeoff score may be used as a multiplication factor to reduce (if relative tradeoff score less than 1) or increase (if relative tradeoff score greater than 1) risk.

Figure 7:
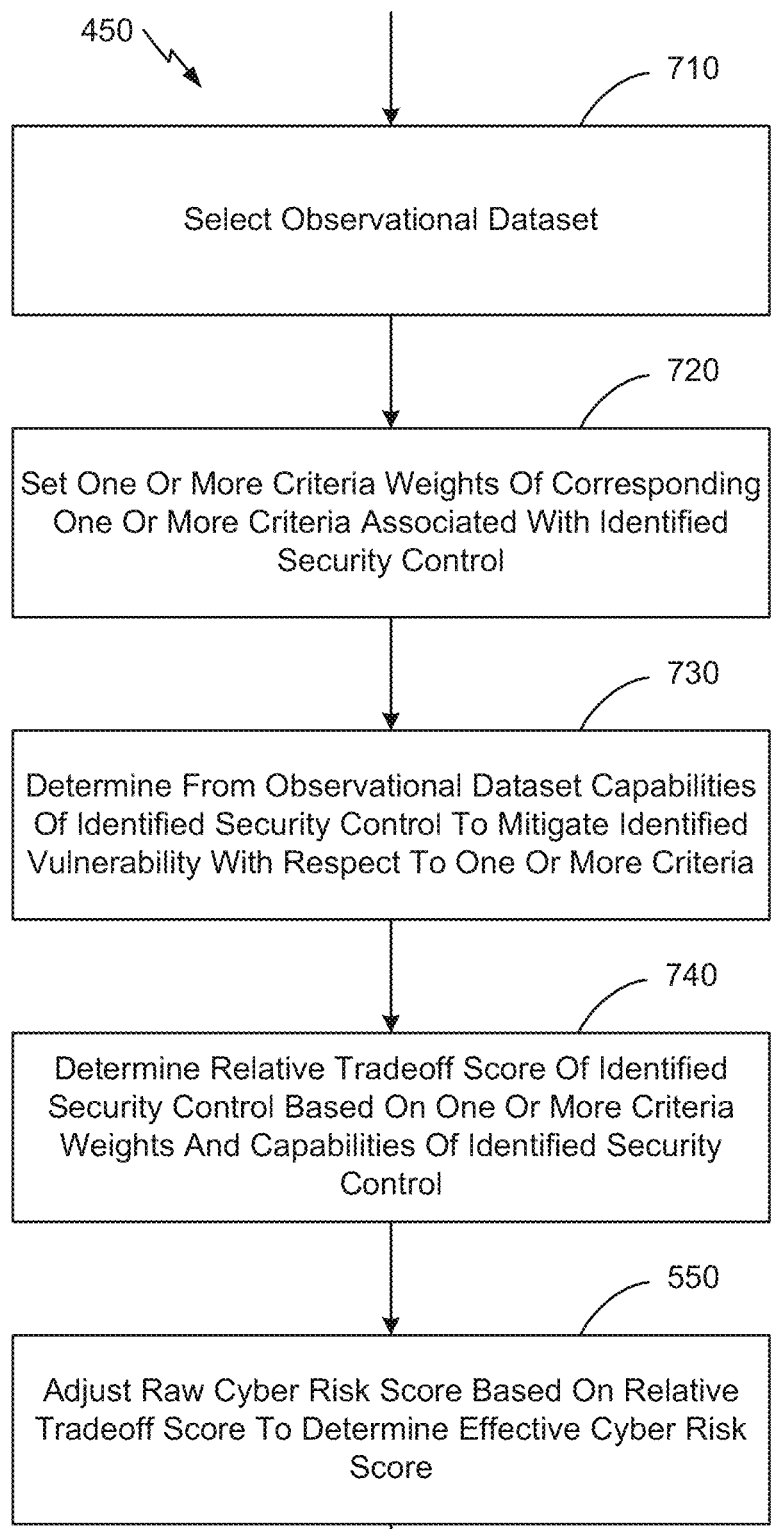

FIG. 7 illustrates a flow chart of another exemplary process that may be performed by the cyber risk scorer to implement block 450. In block 710, the cyber risk scorer may select the observational dataset. Block 710 may be similar to block 510.

In block 720, the cyber risk scorer may set one or more criteria weights of corresponding one or more criteria associated with the identified security control. For example, the cyber risk scorer may receive setting of criteria weights from stakeholders and defenders as indicated above. Each criteria weight v may represent a relative importance of that criteria. Block 720 may be similar to block 520.

In block 730, the cyber risk scorer may determine, from the observational dataset, one or more capabilities of the identified security control to mitigate the identified vulnerability with respect to the one or more criteria associated with the identified security control. For example, the identified security control's capability(ies) to mitigate the identified vulnerability with respect to the one or more criteria with respect to each of the one or more criteria may be determined. Block 730 may be viewed as being a more general form of block 530.

In an aspect, the capabilities of the identified security control may be determined through performing one or more causal inferences (e.g., CFR, CEVAE, Causal Forest, BART, DRNet, etc.) from the observational dataset. The capabilities may be used in weighted averaging. For example, in block 720, a stakeholder may have set criteria weights based on prevention, detection, and response (P/D/R) as $w_p$, $w_d$, and $w_r$, respectively. Then in block 730, the cyber risk scorer may determine, through performing causal inference on the observational dataset, capability to mitigate the identified vulnerability with respect to P/D/R as ($o_p$, $o_d$, $o_r$).

In block 740, the cyber risk scorer may determine a relative tradeoff score of the identified security control based on the one or more criteria weights and on the one or more capabilities of the identified security control. For example, a weighted average may be employed as discussed above with respect to equation (1) to combine information all the sources (e.g., criteria) associating the evidence from each source with the criteria weight.

Figure 8:
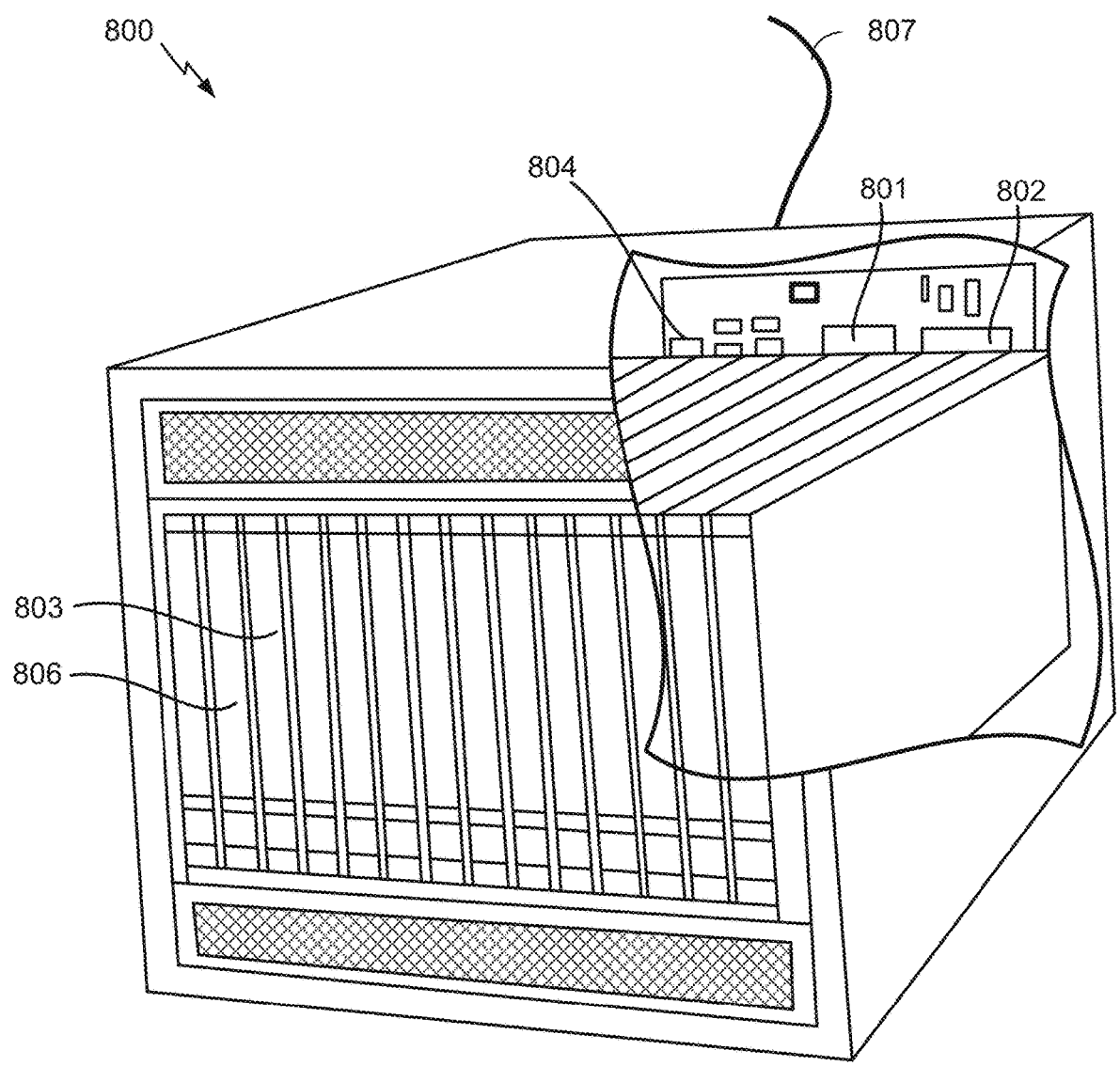
FIG. 8 illustrates an apparatus, according to various aspects.

The various embodiments may be implemented on any of a variety of commercially available computing devices, such as an apparatus 800 illustrated in FIG. 8. In an example, the apparatus 800 may correspond to one example configuration of a computing device on applications that determine cyber risk scores, e.g., as part of a cyber risk scorer configured to perform the method 400 illustrated in FIGS. 4-7.

In FIG. 8, the apparatus 800 may include one or more processors 801 coupled to volatile memory 802 and a large capacity nonvolatile memory, such as a disk drive 803. The apparatus 800 may also include a floppy disc drive, flash/solid state media drive, compact disc (CD) or DVD disc drive 806 coupled to the one or more processors 801. The apparatus 800 may also include network access ports 804 coupled to the one or more processors 801 for establishing data connections with a network 807, such as a local area network coupled to other broadcast system computers and servers or to the Internet. The network access ports 804 may be more broadly described as communicators 804.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects and embodiments described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences, and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in an IoT device. In the alternative, the processor and the non-transitory computer-readable medium may be discrete components in a user terminal.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, flash/solid state media, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes CD, laser disc, optical disc, DVD, floppy disk, and Blu-ray discs, which usually reproduce data magnetically and/or optically with lasers. Combinations of the above should also be included within the scope of computer-readable media.

While the foregoing disclosure shows illustrative aspects and embodiments, those skilled in the art will appreciate that various changes and modifications could be made herein without departing from the scope of the disclosure as defined by the appended claims. Furthermore, in accordance with the various illustrative aspects and embodiments described herein, those skilled in the art will appreciate that the functions, steps, and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A method of determining a cyber risk score of a target asset of a target network, the method comprising:
    gathering a vulnerability scan data of the target asset, the vulnerability scan data being gathered through electronically scanning the target asset;
    identifying a vulnerability from the vulnerability scan data of the target asset;
    determining a raw cyber risk score of the identified vulnerability;
    identifying a security control applicable to the target asset; and
    determining an effective cyber risk score of the target asset corresponding to the raw cyber risk score based directly on the identified security control and based directly on an observational dataset, the observational dataset being associated with a plurality of observational assets, a plurality of observational security controls, and a plurality of observational vulnerabilities, the observational dataset comprising a plurality of observed outcomes, which are outcomes of vulnerability checks of one or more of the observational vulnerabilities performed on one or more of the observational assets on which one or more of the observational security controls are present.

2. The method of claim 1, wherein
    the identified vulnerability is a vulnerability identified by a common vulnerabilities and exposure (CVE) identifier, and
    the raw cyber risk score is a common vulnerability scoring system (CVSS) score associated with the CVE identifier of the identified vulnerability.

3. The method of claim 1, wherein the identified security control comprises any one or more of a patch management system, an antivirus system, an antimalware system, and a host intrusion prevention system.

4. The method of claim 1, wherein the identified security control is a security control installed and active on the target asset when scanning of the target asset associated with the vulnerability scan data is performed.

5. The method of claim 1, wherein the observational dataset is one of
    a patch status dataset gathered from scans of the plurality of observational assets, the scans of the plurality of observational assets covering the plurality of observational vulnerabilities in presence of the plurality of observational security controls, an attack emulation dataset gathered from running attack simulations of one or more articulated attack techniques on the plurality of observational assets in presence of the plurality of observational security controls, the articulated attack techniques covering the plurality of observed vulnerabilities, or a file based mitigation dataset comprising a plurality of file hashes of attacks that occurred on the plurality of observational assets within a threshold past duration, the plurality of file hashes covering the plurality of observed vulnerabilities in presence of the plurality of observational security controls.

6. The method of claim 5, wherein the attack emulation dataset is a MITRE Adversarial Tactics, Techniques, and Common Knowledge (ATT&CK) dataset.

7. The method of claim 1, wherein in the observational dataset, at least one observed outcome of a vulnerability check of an observational vulnerability in a presence of an observational security control includes an indication of any one or more of whether or not the observational vulnerability is prevented in the presence of the observational security control, whether or not the observational vulnerability is detected in the presence of the observational security control, and/or whether or not the observational vulnerability is responded to in the presence of the observational security control.

8. The method of claim 1, wherein determining the effective cyber risk score comprises:

setting one or more criteria weights of corresponding one or more criteria associated with the identified security control, each criteria weight v representing a relative importance of that criteria;

conducting an effectiveness scoring of the identified security control based on the observational dataset; and determining a relative tradeoff score of the identified security control based on an effective score of the identified security control arrived through conducting the effectiveness scoring.

9. The method of claim 8, wherein the one or more criteria weights comprise weights attributed to one or more measurement criteria of the identified security control, the one or more measurement criteria comprising any one or more of effectiveness, coverage, assurance, cost, impact, and mitigation time, the effectiveness being associated with a probability of success to stop a threat related to the identified vulnerability by the identified security control, the coverage being associated with a ratio of number of threats found the target asset that the identified security control can mitigate to a highest number of threats the identified security control can mitigate, the assurance being associated with a measure of trustworthiness and/or maturity of the identified security control, the cost being associated with a total cost of the identified security control, the impact being associated with a measure of how the identified security control affects a capability to prevent, detect, and/or respond to a thread related to the identified vulnerability, and the mitigation time being associated with a measure of how quickly the threat related to the identified vulnerability is mitigated due to the identified security control.

10. The method of claim 8, wherein conducting the effectiveness scoring comprises:

deriving a risk & tradeoff value of the identified vulnerability based on the raw cyber risk score, the risk & tradeoff value representing a decision, and the risk & tradeoff value being a two tuple value (r, t) in which r represents a risk and t represents a tradeoff; and generating one or more ordered weights w of the identified security control from a decision strategy space based on the risk & tradeoff value, the decision strategy space being a space defined within a risk vs tradeoff coordinate space, the risk & tradeoff value representing the decision within the decision strategy space, and the one or more ordered weights w representing a level of risk and tradeoff taken in the decision.

11. The method of claim 10, wherein the decision strategy space is a triangular decision strategy space defined within the risk vs tradeoff coordinate space in which first, second, and third vertices of the triangular decision strategy space are respectively defined by coordinates (r=0, t=0), (r=1, t=0), and (r=0.5, t=1).

12. The method of claim 10, wherein a truncated distributions method is used to generate the one or more ordered weights w.

13. The method of claim 12, wherein in determining the relative tradeoff score of the identified vulnerability, ordered weighted averaging (OWA) is performed on the one or more ordered weights in which an OWA operator $O_w: \mathbb{R}^n \to \mathbb{R}$ associates a set of order weights $w=(w_1, \ldots, w_n)$ such that $\Sigma_{i=1}^n w_i$, i=1 $w_i=1$ to n criteria as $O_w(x_1, \ldots, x_n) = \Sigma_{i=1}^n w_i x_{(i)}$, where $x_{(i)}$ is the $i^{th}$ lowest value in $(x_1, \ldots, x_n)$, $x_i$, i=1 ... n being a contributing evidence of each corresponding criteria associated with the identified security control, and wherein the OWA operator is applied to the identified security control according to $$OWA_i = \sum_{j=1}^{n} \left( \frac{v_{(j)} w_j}{\sum_{k=1}^{n} v_{(k)} w_k} \right) z_{i(j)},$$

where $z_{i(j)}$ is $j^{th}$ lowest element of a collection of criteria $z_{ij}$ for the identified security control i and $v_{(j)}$ is a $j^{th}$ criteria weight, each criteria weight representing a relative importance of corresponding criteria.

14. The method of claim 10, wherein in determining the relative tradeoff score of the identified vulnerability, one or more individual treatment effect (ITE) estimation of the identified security control are made, the one or more ITEs being estimated through performing one or more causal inferences from the observational dataset.

15. The method of claim 14, wherein the one or more causal inferences performed include one or more of a Counterfactual Regression (CFR), Causal Effect Variational Autoencoder (CEVAE), Causal Forest, Bayesian Additive Regression Trees (BART), and Dose Response Network (DRNet).

16. The method of claim 8, wherein determining the effective cyber risk score further comprises:

adjusting the raw cyber risk score based on the relative tradeoff score to determine the effective cyber risk score.

17. The method of claim 1, wherein determining the effective cyber risk score comprises:
setting one or more criteria weights of corresponding one or more criteria associated with the identified security control, each criteria weight v representing a relative importance of that criteria;
determining, from the observational dataset, one or more capabilities of the identified security control to mitigate the identified vulnerability with respect to the one or more criteria associated with the identified security control; and
determining a relative tradeoff score of the identified security control based on the one or more criteria weights and on the one or more capabilities of the identified security control.

18. The method of claim 17, wherein the one or more capabilities of the identified security control are determined through performing one or more causal inferences from the observational dataset.

19. The method of claim 18, wherein the one or more causal inferences performed include one or more of a Counterfactual Regression (CFR), Causal Effect Variational Autoencoder (CEVAE), Causal Forest, Bayesian Additive Regression Trees (BART), and Dose Response Network (DRNet).

20. The method of claim 17, wherein in determining relative tradeoff score of the identified security control, each criteria weight is combined with the capability of the identified security control with respect to that criteria weight.

21. A cyber risk scorer, comprising:
a memory; and
at least one processor coupled to the memory,
wherein the memory and the at least one processor are configured to:
gather a vulnerability scan data of a target asset, the vulnerability scan data being gathered through electronically scanning the target asset;
identify a vulnerability from the vulnerability scan data of the target asset of a target network;
determine a raw cyber risk score of the identified vulnerability;
identify a security control applicable to the target asset; and
determine an effective cyber risk score of the target asset corresponding to the raw cyber risk score based directly on the identified security control and based directly on an observational dataset, the observational dataset being associated with a plurality of observational assets, a plurality of observational security controls, and a plurality of observational vulnerabilities, the observational dataset comprising a plurality of observed outcomes, which are outcomes of vulnerability checks of one or more of the observational vulnerabilities performed on one or more of the observational assets on which one or more of the observational security controls are present.

22. The cyber risk scorer of claim 21,
wherein the identified vulnerability is a vulnerability identified by a common vulnerabilities and exposure (CVE) identifier, and the raw cyber risk score is a common vulnerability scoring system (CVSS) score associated with the CVE identifier of the identified vulnerability, and
wherein the identified security control comprises any one or more of a patch management system, an antivirus system, an antimalware system, and a host intrusion prevention system.

23. The cyber risk scorer of claim 21, wherein the observational dataset is one of
a patch status dataset gathered from scans of the plurality of observational assets, the scans of the plurality of observational assets covering the plurality of observational vulnerabilities in presence of the plurality of observational security controls,
an attack emulation dataset gathered from running attack simulations of one or more articulated attack techniques on the plurality of observational assets in presence of the plurality of observational security controls, the articulated attack techniques covering the plurality of observed vulnerabilities, or
a file based mitigation dataset comprising a plurality of file hashes of attacks that occurred on the plurality of observational assets within a threshold past duration, the plurality of file hashes covering the plurality of observed vulnerabilities in presence of the plurality of observational security controls.

24. The cyber risk scorer of claim 21, wherein in the observational dataset, at least one observed outcome of a vulnerability check of an observational vulnerability in a presence of an observational security control includes an indication of any one or more of
whether or not the observational vulnerability is prevented in the presence of the observational security control,
whether or not the observational vulnerability is detected in the presence of the observational security control, and/or
whether or not the observational vulnerability is responded to in the presence of the observational security control.

25. The cyber risk scorer of claim 21, wherein in determining the effective cyber risk score, the memory and the at least one processor are configured to:
set one or more criteria weights of corresponding one or more criteria associated with the identified security control, each criteria weight v representing a relative importance of that criteria;
conduct an effectiveness scoring of the identified security control based on the observational dataset; and
determine a relative tradeoff score of the identified security control based on an effective score of the identified security control arrived through conducting the effectiveness scoring.

26. The cyber risk scorer of claim 25, wherein in conducting the effectiveness scoring of the security control, the memory and the at least one processor are configured to:
derive a risk & tradeoff value of the identified vulnerability based on the raw cyber risk score, the risk & tradeoff value representing a decision, and the risk & tradeoff value being a two tuple value (r, t) in which r represents a risk and t represents a tradeoff; and
generate one or more ordered weights w of the identified security control from a decision strategy space based on the risk & tradeoff value, the decision strategy space being a space defined within a risk vs tradeoff coordinate space, the risk & tradeoff value representing the decision within the decision strategy space, and the one or more ordered weights w representing a level of risk and tradeoff taken in the decision, wherein the decision strategy space is a triangular decision strategy space defined within the risk vs tradeoff coordinate space in which first, second, and third vertices of the triangular decision strategy space are respectively defined by coordinates (r=0, t=0), (r=1, t=0), and (r=0.5, t=1), and wherein the memory and the at least one processor are configured to use truncated distributions method to generate the one or more ordered weights w.

27. The cyber risk scorer of claim 26, wherein in determining the relative tradeoff score of the identified vulnerability, the memory and the at least one processor are configured to:

perform ordered weighted averaging (OWA) on the one or more ordered weights in which an OWA operator $O_w$: $\mathbb{R}^n \to \mathbb{R}$ associates a set of order weights w= $(w_1, \ldots, w_n)$ such that $\Sigma_{i=1}^n w_i$, i=1 $w_i$=1 to n criteria as $O_w(x_1, \ldots, x_n) = \Sigma_{i=1}^n w_i x_{(i)}$, where $x_{(i)}$ is the $i^{th}$ lowest value in $(x_1, \ldots, x_n)$, $x_i$, i=1 ... n being a contributing evidence of each corresponding criteria associated with the identified security control, and wherein the OWA operator is applied to the identified security control according to $$OWA_i = \sum_{j=1}^{n} \left( \frac{v_{(j)} w_j}{\sum_{k=1}^{n} v_{(k)} w_k} \right) z_{i(j)},$$

where $z_{i(j)}$ is $j^{th}$ lowest element of a collection of criteria $z_{ij}$ for the identified security control i and $v_{(j)}$ is a $j^{th}$ criteria weight, each criteria weight representing a relative importance of corresponding criteria.

28. The cyber risk scorer of claim 26, in determining the relative tradeoff score of the identified vulnerability, the memory and the at least one processor are configured to estimate one or more individual treatment effects (ITE), the one or more ITEs being estimated through performing one or more causal inferences from the observational dataset.

29. The cyber risk scorer of claim 21, wherein in determining the effective cyber risk score, the memory and the at least one processor are configured to:

set one or more criteria weights of corresponding one or more criteria associated with the identified security control, each criteria weight v representing a relative importance of that criteria;

determine, from the observational dataset, one or more capabilities of the identified security control to mitigate the identified vulnerability with respect to the one or more criteria associated with the identified security control; and determine a relative tradeoff score of the identified security control based on the one or more criteria weights and on the one or more capabilities of the identified security control.

30. The cyber risk scorer of claim 29, wherein the memory and the at least one processor are configured to determine the one or more capabilities of the identified security control through performing one or more causal inferences from the observational dataset.

31. A non-transitory computer-readable medium storing computer-executable instructions for a cyber risk scorer, comprising:

one or more instructions causing the cyber risk scorer to gather a vulnerability scan data of a target asset, the vulnerability scan data being gathered through electronically scanning the target asset;

one or more instructions causing the cyber risk scorer to identify a vulnerability from the vulnerability scan data of the target asset of a target network;

one or more instructions causing the cyber risk scorer to determine a raw cyber risk score of the identified vulnerability;

one or more instructions causing the cyber risk scorer to identify a security control applicable to the target asset; and one or more instructions causing the cyber risk scorer to determine an effective cyber risk score of the target asset corresponding to the raw cyber risk score based directly on the identified security control and based directly on an observational dataset, the observational dataset being associated with a plurality of observational assets, a plurality of observational security controls, and a plurality of observational vulnerabilities, the observational dataset comprising a plurality of observed outcomes, which are outcomes of vulnerability checks of one or more of the observational vulnerabilities performed on one or more of the observational assets on which one or more of the observational security controls are present.

32. The non-transitory computer-readable medium of claim 31, wherein the one or more instructions causing the cyber risk scorer to determine the effective cyber risk score of the identified vulnerability comprise:

one or more instructions causing the cyber risk scorer to set one or more criteria weights of corresponding one or more criteria associated with the identified security control, each criteria weight v representing a relative importance of that criteria;

one or more instructions causing the cyber risk scorer to conduct an effectiveness scoring of the identified security control based on the observational dataset; and one or more instructions causing the cyber risk scorer to determine a relative tradeoff score of the identified security control based on an effective score of the identified security control arrived through conducting the effectiveness scoring.

* * * * *